United States Patent [19]
Cherrington et al.

[11] Patent Number: 6,070,155
[45] Date of Patent: *May 30, 2000

[54] INTEGRATED AUTOMATED ANALYSIS AND REPAIR

[75] Inventors: John K. Cherrington, Escondido; Aaron F. Cherrington, Carlsbad, both of Calif.

[73] Assignee: Automated Vehicle Anaysis, Inc., Escondido, Calif.

[*] Notice: This patent is subject to a terminal disclaimer.

[21] Appl. No.: 09/016,261

[22] Filed: Jan. 30, 1998

Related U.S. Application Data

[63] Continuation-in-part of application No. 08/462,428, Jun. 5, 1995, Pat. No. 5,717,595, which is a continuation-in-part of application No. 08/372,002, Jan. 12, 1995, Pat. No. 5,657,233.

[51] Int. Cl.[7] ........................................ G06F 17/60
[52] U.S. Cl. ................. 705/400; 73/117.2; 345/173; 702/127; 705/16
[58] Field of Search ................ 73/117.2, 117.3, 73/121; 340/870.28; 345/173; 701/19; 705/1, 16, 28, 29, 400; 702/127, 157, 158

[56] References Cited

U.S. PATENT DOCUMENTS

| | | | |
|---|---|---|---|
| 3,006,076 | 10/1961 | Wisti | 33/178 |
| 3,314,049 | 4/1967 | Felcheck | 364/401 |
| 3,485,093 | 12/1969 | Muller et al. | 364/551 |
| 3,889,378 | 6/1975 | Senecal | 33/143 R |
| 4,404,639 | 9/1983 | McGuire et al. | 364/551 |
| 4,441,359 | 4/1984 | Ezoe | 73/117 |
| 4,757,463 | 7/1988 | Ballou et al. | 364/551 |
| 4,782,595 | 11/1988 | Diewert | 33/147 J |
| 4,930,096 | 5/1990 | Shimizu et al. | 364/550 |
| 4,967,381 | 10/1990 | Lane et al. | 364/551 |
| 5,029,402 | 7/1991 | Lazecki et al. | 33/784 |
| 5,128,859 | 7/1992 | Carbone et al. | 364/401 |
| 5,239,486 | 8/1993 | Mortier | 364/551 |
| 5,317,503 | 5/1994 | Inoue | 700/90 |
| 5,377,098 | 12/1994 | Sakai | 364/401 |
| 5,434,904 | 7/1995 | Wong | 364/401 |
| 5,504,674 | 4/1996 | Chen et al. | 364/401 |
| 5,657,233 | 8/1997 | Cherrington et al. | 705/400 |
| 5,717,595 | 2/1998 | Cherrington et al. | 705/400 |
| 5,893,082 | 4/1999 | McCormick | 705/400 |

Primary Examiner—Edward R. Cosimano
Attorney, Agent, or Firm—Fitch, Even, Tabin & Flannery

[57] ABSTRACT

An integrated highly automated analysis system employs a technician terminal for displaying a plurality of inspection screens, and for entering inspection results. The technician terminal generates an inspection report after the inspection results have been input. A point-of-sale terminal is used to generate a cost estimate report in response to the generation of the inspection report and also generates an invoice report. The system includes a plurality of databases, including an inspection guideline database, a specifications database (containing specifications), a customer/inspection database (containing prior inspection records), and a parts catalog database (containing part numbers and part costs).

19 Claims, 16 Drawing Sheets

INTEGRATED AUTOMATED ANALYSIS AND REPAIR

This application is a Continuation-in-Part of U.S. Ser. No. 08/462,428, filed Jun. 5, 1995, for IMPROVED INTEGRATED AUTOMATED VEHICLE ANALYSIS, now U.S. Pat. No. 5,717,595, which is a Continuation-in-Part of U.S. Ser. No. 08/372,002, filed Jan. 12, 1995, now U.S. Pat. No. 5,657,233 for INTEGRATED AUTOMATED VEHICLE ANALYSIS, all of which are incorporated herein by reference.

BACKGROUND OF THE INVENTION

The present invention relates to analysis and repair, and more particularly to integrated highly automated systems and procedures for diagnosis, cost estimating, invoicing and repair in the servicing of mechanical and electrical systems and the like.

The servicing of complex systems, for example, internal combustion engine automobiles, has become extremely complicated and, to some extent, virtually impossible for some persons to perform. This problem extends to many mechanical and electrical systems as well as other systems, because of the complexity of these modern systems, the inadequacy of and rapid changes in available specifications and in some cases changes in regulatory requirements applicable to the systems. Further, the capability of some diagnostic equipment used in diagnosing and servicing some systems has not kept pace with changes in the systems themselves. Added to these complications is a growing scarcity of personnel trained in servicing such complicated systems.

For example, whereas it has been possible to service many vehicles with internal combustion engines by checking the condition of ignition parts, carburetor adjustments, or electrical systems, and replacing some or all parts, the newer vehicles have engines that do not have the older conventional ignition parts, the fuel supply is not easily adjusted, and the electrical system is sometimes separately controlled by its own built-in computer. Electronic systems also now control systems within vehicles such as the air conditioner, the exhaust system, the suspension and the braking system. Some governmental regulatory agencies prohibit some adjustments to critical parts, or have established operating conditions for vehicle engines that require adjustments to an engine's operation that can only be accomplished with special test equipment.

Personnel that service systems such as vehicles also may contribute to servicing problems. Often because the environment of a repair shop, the environment on a customer's site, or the environment in on an assembly line is quite noisy and/or otherwise distracting, and because the technicians working therein are under a great deal of pressure to quickly inspect and diagnose the systems on which they are working, important diagnostic steps may be skipped or incorrectly carried out. This can result in needed repairs being overlooked, resulting in potentially dangerous conditions. This is of particular concern when critical safety systems are involved, such as a vehicle's braking system or suspension, but is also of concern when a problem is not correctly diagnosed and repaired the first time a system is serviced because this leads to customer irritation and possibly loss of business. Other systems, such as the exhaust system or the air conditioning system in an automobile, if not inspected properly, can require unscheduled maintenance or repair.

The dissemination of original system specifications, changes to such specifications, and other pertinent information relating to specific systems has also become problematic. It is difficult to get the latest information to the system owner and to get the latest information to the system service agency. It may also be difficult to get the person to whom the information is sent to read and apply the information to the diagnostic and servicing function.

It has long been known to provide paper manuals for system specifications, repair instructions and, more recently, to provide the specifications and instructions in microfilm systems. Both paper manuals and microfilm systems require updating by physical replacement of outdated information and therefore have the problem of being dependent, to some extent, upon the interest and motivation of the receiver of the information. Furthermore, it is not uncommon for errors to occur in the updating of paper manuals or microfilm systems, resulting in outdated or missing information.

In the vehicle field, electronic engine analyzers are also known, some of which are general purpose for use with many vehicles and some of which are specific to a particular manufacturer's vehicle. Some vehicle manufacturers have built microprocessors into the vehicle so as to provide part or all of the engine analysis function. Some engine analyzers merely measure existing conditions in a vehicle and are unable to compare the measured conditions to a reference standard that defines what the measured condition should be. Other analyzers provide complete diagnostic capabilities including advising the operator on what corrections should be made.

Once a vehicle has been diagnosed, the diagnosis is generally reviewed by a customer and a determination is made by the customer as to what repairs he or she wishes to have performed. A service advisor or mechanic may assist the customer in the review and may advise the customer as to which of the indicated repairs are needed, or required, and which are merely suggested. The determination of which repairs are needed and which are merely suggested is highly subjective and wide discretion is exercised by the mechanic or service advisor. This discretion, and the desire on the part of some service advisors to increase the cost of vehicle service (and therefore their profits) by characterizing some repairs as required when they are in fact merely suggested, leads to discomfort on the part of the customer, which problematically breeds ill will and dissatisfaction. Unfortunately, this problem exists outside the vehicle field as well.

Before repairs are performed on a vehicle, many states require that the customer be provided with a written estimate of repair costs, and that the actual costs of performed repairs not exceed the estimate by more than a prescribed amount, e.g., ten percent. There is a great deal of discretion on the part of the service advisor in generating the estimate, which results in under and over estimation of costs. If the costs are under estimated, state law may prohibit the repair shop from charging the customer a correct amount. If the costs are over estimated, the customer may be subject to over charging. The problem of over estimating and under estimating may be compounded due to miscommunications between the technician or mechanic performing the vehicle diagnosis and the person who prepares the estimate. The diagnosis is generally communicated to the customer and the person preparing the estimate via a paper report that is hand prepared by the technician. Such hand-prepared reports are subject to numerous errors, both in entering the information and in interpreting the entered information. Further, as with the problems of customer discomfort, ill will, and dissatisfaction, this problem exists outside the vehicle field as well.

In any service/repair environment, after repairs are performed, it is further necessary for the repair shop to generate an invoice reciting the charges assessed to the customer for services and parts. Such invoice, as mentioned above, must often not exceed the estimate by more than a legally prescribed amount, e.g., ten percent, if any. Preparation of the invoice is generally performed manually. Verification that the invoice does not exceed the estimate by more than the prescribed amount is also performed manually. Unfortunately, manually prepared invoices and other reports are error prone and consume significant amounts of time for those preparing such invoices and reports.

From the above, it is evident that improvements are needed in the way that systems are diagnosed, serviced and invoiced.

SUMMARY OF THE INVENTION

The present invention advantageously addresses the needs above as well as other needs by providing a vehicle analysis system and method for integrated highly automated diagnosis, cost estimation and invoicing in the servicing of self-propelled motorized vehicles.

In one embodiment, the present invention can be characterized as an integrated diagnosis, repair and invoicing system comprising: a technician terminal including means for displaying a plurality of inspection screens, means for inputting inspection results, and means for generating an inspection report; a point-of-sale terminal coupled to the technician terminal, the point-of-sale terminal including means for generating a cost estimate report in response to the generation of the inspection report; a printer coupled to the point-of-sale terminal for printing the cost estimate report; and a database system coupled to the technician terminal and to the point-of-sale terminal, the data base system comprising a specifications database comprising specifications. The technician terminal compares the specifications with the inspection results, and generates the inspection report in response to the comparing.

In another embodiment, the present invention can be characterized as a method including: selecting a make and model of a system being inspected using a first computer system; retrieving a measurement/specification for the system being inspected, having been selected, from a measurements/specifications database; prompting a user of the first computer system to conduct an inspection of the system being inspected and to enter an inspection result into the first computer system; comparing the inspection result with the measurement/specification, having been retrieved, so as to determine whether the inspection result is outside a first prescribed tolerance of the measurement/specification, having been retrieved; generating an inspection report that indicates whether the inspection result is outside the first prescribed tolerance of the measurement/specification; communicating the inspection report to a second computer system; and generating, within the second computer system, a cost estimate report in the event the inspection result is outside the first prescribed tolerance of the measurement/specification, the cost estimate report indicating an expected cost of repair.

In a further embodiment, the present invention can be characterized as an integrated inspection system comprising: a video display; a computer coupled to the video display, the computer including means for causing display information to be displayed on the video display; input means for inputting input information into the computer, the input means being coupled to the computer; a database system coupled to the computer, the data base system comprising: a specifications database comprising specifications, the computer including means for comparing the specifications with the input information, and means for generating an inspection report in response to the means for comparing; and a repair manual database comprising instructions for making selected repairs, the computer including means for signalling the video display to display the instructions on the video display.

In another embodiment, the invention can be characterized as an integrated diagnosis, repair and invoicing system. The system employs a technician terminal for displaying a plurality of inspection screens, and for entering inspection results. A preferred implementation of the technician terminal includes a video display and touch screen coupled to a computer through a spread spectrum frequency hopping radio channel. The technician terminal generates an inspection report after the inspection results have been input. A point-of-sale terminal is used to generate a cost estimate report in response to the generation of the inspection report and also generates and prints an invoice report. The preparation of such reports—inspection, cost-estimate and invoice—is made easy through the use of several databases. An inspection guidelines database, for example, is made up of inspection guidelines accessible, e.g., from the inspection screens. A specification database contains system specifications for the system being serviced. The technician terminal compares the specifications from the specification database with the inspection results in generating the inspection report. A customer/inspection database contains inspection records made in response to the generating of the inspection report. A parts catalog database includes part numbers, part descriptions, and/or part costs.

In a further embodiment, the invention can be characterized as a method. The method includes selecting a particular make and model of a system using a first computer system; retrieving a measurement/specification for the system from a measurements/specifications database; and prompting a user of the first computer system to conduct an inspection of the system being serviced and to enter an inspection result into the first computer system. The method also includes comparing the inspection result with the retrieved measurement/specification and determining whether the inspection result is outside a first prescribed tolerance of the measurement/specification. Next, the method includes generating an inspection report that indicates whether the inspection result is outside the first prescribed tolerance of the measurement/specification, and communicating the inspection report to a second computer system. Within the second computer system a cost estimate report is generated in the event the inspection result is outside the first prescribed tolerance of the measurement/specification. The cost estimate report indicates an expected cost of repair. The method further includes generating, within the second computer system, an invoice report in response to the cost estimate report. The invoice report indicates a cost charged for repair of the system being serviced.

It is therefore a feature of the invention to provide an analysis and repair system and method for use in servicing mechanical and/or electrical systems that provide for integrated highly automated diagnosis, cost estimation and invoicing.

It is another feature of the invention to provide such analysis and repair system wherein an inspection report is generated in response to inspection results that are entered into a technician terminal.

It is a supplementary feature of the invention to automatically generate the inspection report based on discrepancies between the inspection results and system specifications.

It is a further feature of the invention to generate a cost estimate based on the inspection report.

It is an additional feature of the invention to generate and print an invoice based on the cost estimate.

It is an added feature of the invention, in one embodiment, to provide inspection guidelines that are accessible from inspection screens.

It is a supplementary feature of the invention to provide repair instructions in response to the inspection report.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
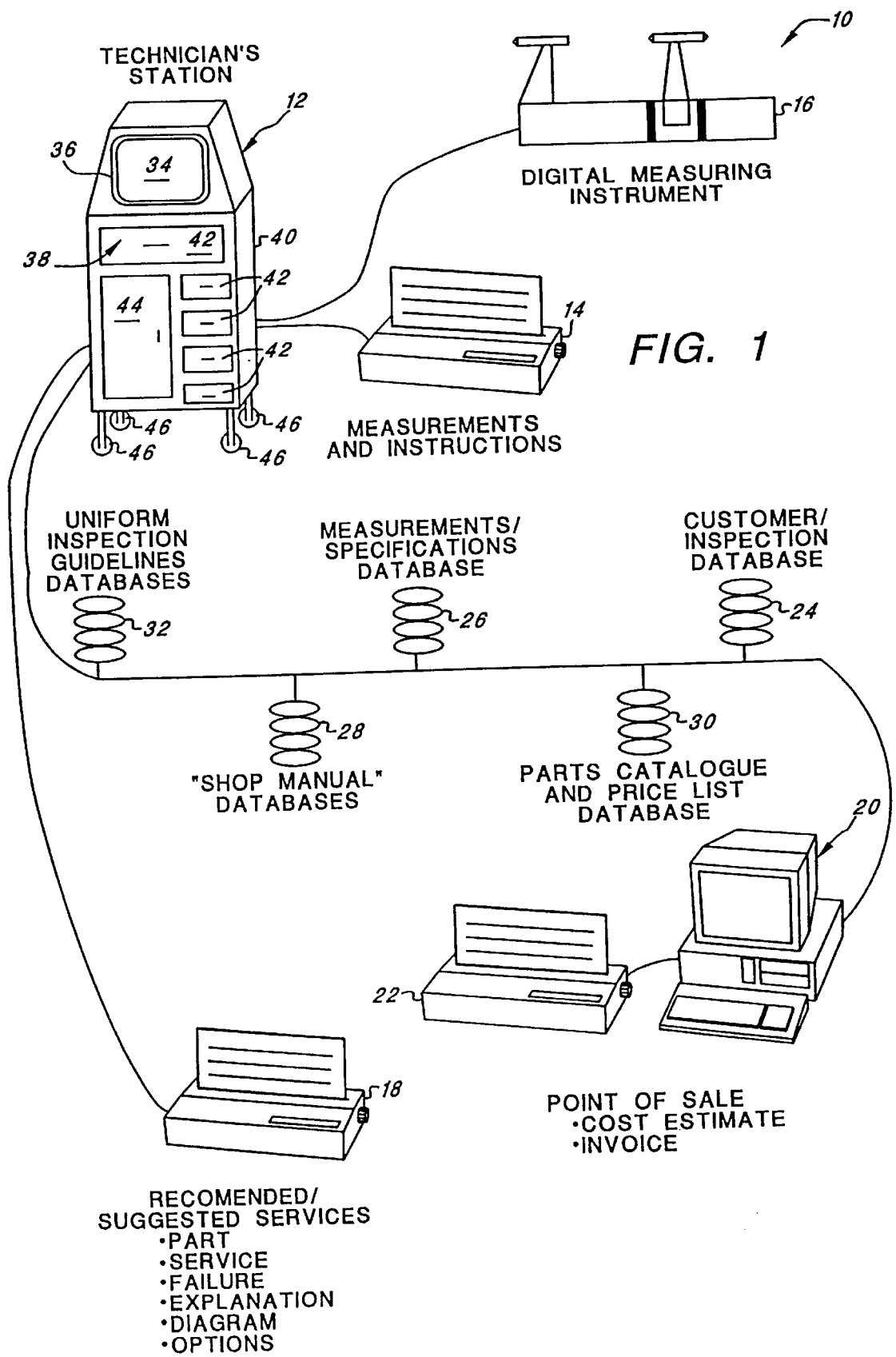
FIG. 1 is schematic diagram of components employed in one embodiment of the present invention.

Referring first to FIG. 1, a schematic diagram is shown of components employed in one embodiment of an integrated highly automated vehicle diagnosis, estimating, and invoicing system 10. A technician terminal 12 is coupled to a measurement and instructions printer 14 and to a digital measuring instrument 16. A recommended/suggested services printer 18 is also coupled to the technician terminal 12, as is a point of sale terminal 20, and a point of sale printer 22. Note that the measurement and instructions printer 16, the recommended/suggested services printer 18 and the point of sale printer 22 are described herein as being separate printers. However, it will be understood by one skilled in the art that the functions of these three printers 14, 18, 22, as described herein, may in practice be carried out either by three separate printers or by two or fewer printers possibly connected to the first and second personal computers through a network. In particular, the measurements and instructions printer 14 and the suggested/recommended services printer 18 are preferably a single printer carrying out the functions of these printers 14, 18.

Also coupled to the technician terminal 12 are a customer/inspection database 24, a measurements/specifications database 26, a shop manual database 28, a parts catalog database 30, and an inspection guidelines database 32.

The technician terminal 12 includes a video display 34, such as a cathode ray tube (CRT), a touch screen interface 36, a first personal computer 38 and a ruggedized housing 40. The first personal computer 38 is modified with an inspection program that causes the first personal computer 38 to display a sequence of input screens on the first video display 34. These inspection screens are explained in more detail hereinbelow, however, it is important to note that the sequence of input screens requires that a technician sequentially enter data for each of a plurality of sequential inspection steps, such that the technician cannot move to a subsequent inspection step without first inputting information from a current inspection step. As a result, the technician is discouraged from skipping steps in the inspection.

The technician inputs results from each inspection step via the touch screen interface 36, which is coupled to the first personal computer 38 and to the first video display 34. As a result, it is preferably unnecessary for the technician to utilize a keyboard or other input device when inputting inspection results—advantageously avoiding problems associated with keyboard use, such as limited space; sensitivity to dirt, grease and smoke; and susceptibility to damage by tools and vehicle parts as they are moved from location to location. In order to input inspection results, for example, the technician may be presented with an inspection category, such as, a "parking brake inspection" and may further be presented with the option of indicating the parking brake is okay, or that the parking is "inoperative" or has "excessive travel." The technician selects the condition of the inspected component, e.g., the parking brake, by pointing to a respective area on the first video display 34 at which the condition or problem is printed, e.g., "excessive travel," "inoperative" or "okay." In this way, the technician is able to specify a condition for each inspection category in each inspection step without the need for a computer keyboard or other such input device, and further, without the need for typing out the results of the inspection. This feature of the present embodiment offers several advantages, including ease of use for the technician and greater consistency in the responses given in each of the inspection categories (because the selectable conditions are predefined).

Note that conditions may also be specified by selecting a "keyboard" on the first video display 34. This is done by touching an area of the first video display displaying the word "keyboard," which causes the inspection program to display a QWERTY keyboard (i.e., a standard keyboard layout—QWERTY representing the first six letters of the top row of keys on a standard keyboard) on the first video display 34. The technician then specifies the condition by sequentially touching areas of the first video display 34 associated with letters of words that he or she wishes to use in specifying the condition. A "space bar" is also provided as part of the displayed keyboard to put spaces between the words.

The first personal computer 38 is located within the ruggedized housing 40, which may also include drawers 42, cabinets 44 and other storage compartments for storage of tools and/or the digital measuring instrument 16. Further, the ruggedized housing 40 is preferably mounted on wheels 46, or casters, such that it can easily be rolled from one location to another by a person. As a result, it is possible to use the technician terminal to conduct inspections on a plurality of vehicles at a plurality of locations within a vehicle repair facility.

One type of inspection that is facilitated by the present embodiment is a measurement of the brake rotor or drum condition. This inspection is performed using the digital measuring instrument 16, which in one variation of the present embodiment is a dual-action digital caliper. The dual-action digital caliper is coupled through an RS-232 interface on the first personal computer 38 and thereby supplies the first personal computer 38 with data indicative of the brake rotor and/or drum measurements. The dual-action digital caliper is described in further detail hereinbelow.

In practice, when a "brake measurements" inspection screen is displayed, the technician is prompted to input the measurements of a brake rotor and/or drum. In order to input the thickness of the brake rotors, first and second contact pins of the dual-action digital caliper are placed against the opposing surfaces of the brake rotor and are closed tightly thereagainst. The second contact pin (or second point) is slidable relative to the first contact pin (or first point), thereby facilitating its tightening against the opposing surfaces. A linear encoder is positioned along a rail along which the second contact pin slides. When the dual-action digital caliper is closed against the opposing surfaces of the brake rotor, the linear encoder generates a distance signal indicative of the position of the second contact pin (second point) relative to the first contact pin (first point) and the technician presses a button on the dual-action digital caliper, which sends the measurement taken to the inspection program in the technician terminal. The measurement is input into the "brake measurements" inspection screen generated by the inspection program.

Similarly, the brake drum can be measured by placing third and fourth contact pins (or third and fourth points) of the dual-action digital caliper against opposing interior annular surfaces of the drum. The caliper is opened against the interior annular surface of the drum until the contact pins (or points) tightly contact the annular surface. Once the dual-action digital caliper is tightly against the interior annular surface of the brake drum, the button is again pushed and the measurement indicated by the linear encoder is sent to the inspection program within first personal computer and input to the "brake measurements" inspection screen.

Note that, in practice, the technician inputs the make, model and year of the vehicle being inspected prior to conducting the inspection. The inspection program accesses the measurements/specifications database 26 in order to determine the configuration of braking equipment for the vehicle being inspected. As a result, the inspection program will only request measurements for rotors and/or brake drums as appropriate for the particular make, model and year of vehicle on which the inspection is being conducted.

From any of the inspection screens, the technician may select an area of the first video display labeled "Uniform Inspection Guidelines" or "Standards of Service." By selecting this area of the screen the inspection program is signaled to access the inspection guidelines database 32 and to display appropriate inspection guidelines (as promulgated, e.g., under the Maintenance Awareness Program (MAP)) on the first video display 34. The inspection guidelines retrieved from the inspection guidelines database 32 are automatically selected based on the particular inspection screen at which "Uniform Inspection Guidelines" is selected. In this way, the technician is able to view context-sensitive inspection guidelines for the area of the vehicle being inspected without the need for the technician to leave the inspection area to consult printed manuals containing inspection guidelines. The ease with which context-sensitive inspection guidelines can be retrieved serves as an incentive for the technician to consult the inspection guidelines and therefore to conduct a more thorough, complete and uniform inspection of the vehicle.

Upon completion of the inspection, the technician may touch an area of the first video display 34 displaying the word "print." In response to touching the area displaying the word "print," referred to herein as the print "button," a recommended/suggested services report is printed from the recommended/suggested services printer 18 and is also stored in the customer/inspection database 24. The report contains a list of recommended services, including the part, the service, the failure and an explanation of the failure, and a diagram of the effected system within the vehicle such that a customer can easily determine what part and/or service it is that is recommended or required. A notation is made on the recommended/suggested services report that the required services must be performed and the suggested services should be performed.

Determination as to whether a particular service is recommended or required is made automatically by the inspection program based on the inspection results, and the inspection guidelines retrieved from the inspection guidelines database 32, and measurements and specifications retrieved from the measurements/specifications database 26. For example, required services may include those services or parts which relate to aspects of the inspection which were out of specification or tolerance. The suggested services, in contrast, may relate to those aspects of the inspection which indicate parts or services that are still within specification, but that are within a prescribed tolerance, i.e., a percentage, e.g., fifteen percent, or a prescribed amount of being out of specification. For example, when brake pad measurements are taken, if the brake pads have less than one or two thirty-seconds of an inch thickness, they are suggested for replacement. Each suggested or required service or part repair/replacement is automatically accompanied by a detailed standardized explanation of the "condition" selected by the technician during the inspection.

Based on the recommended/suggested services report, which is typically handed to the customer (or vehicle owner), the customer is able to decide whether he/she wishes to have the suggested services and/or part replacements performed and whether he/she desires to have the required services and/or part replacements performed.

Along with the printing of the recommended/suggested services report, the inspection report is communicated to the point of sale terminal 20, which is modified with a point of sale program. The point of sale terminal 20 employs a second personal computer, a second video display and a keyboard, all of which are of conventional design. The point of sale program is accessed by an operator of the point of sale terminal 20 and an estimate of the cost of each of the needed services, both recommended and suggested, is generated and displayed on the second video display. Furthermore, the parts catalog database 30 is accessed by the point of sale terminal 20 and the cost of the parts needed for each proposed repair is automatically retrieved. Based on the inspection report and on the estimated costs for each of the services and for each of the parts, a cost estimate report is generated, stored in the customer/inspection database 24 and printed on the point of sale printer 22. The cost estimate can easily be modified by the operator of the point of sale terminal in accordance with any discounts, service packages, or the like. Based on the printed cost estimate, the customer decides what services he/she wishes to have performed. In this way, an accurate cost estimate can be generated based directly on the information generated and stored as the inspection report.

Once the customer approves the work to be done, the technician returns to the technician terminal from which he/she can access the parts catalog database 30, the shop manual database 28, and the measurements/specifications database 26. These databases 20, 28, 26 provide information relating to the particular make, model and year of vehicle on which the inspection was performed. The shop manual database 28 contains detailed illustrations and instructions to the technician regarding how various repairs are to be performed and how various components of the vehicle are assembled and disassembled. For example, the shop manual database 28 may include an electronic version of MITCHELL'S shop manual. The measurements/specifications database 26 provides information to the technician regarding specifications for the vehicle being serviced. One example of a specifications database is a "Huth" card program, which includes specifications for bending custom exhaust pipes. Another example of a specifications database, such as an electronic version of CHILTON'S manual, specifies component tolerances for various system components within the vehicle, such as brake rotor or drum tolerances. The parts catalog database 30 provides a list of parts and part numbers needed to perform the recommended/suggested services that were approved by the customer and identified in the inspection report. In this way, the technician is able to access a shop manual, and retrieve part numbers and vehicle specifications without the need for accessing printed manuals, which generally will not be located conveniently at the technician's work area where the vehicle is being inspected and serviced. Furthermore, because the parts catalog database 30 is automatically accessed by the inspection program, the technician does not need to search for the appropriate parts number and descriptions when performing approved repairs. Rather, the appropriate part numbers and descriptions are automatically accessed for the technician, thereby speeding up the process of vehicle repair and reducing the possibility of error.

The measurements and specifications retrieved from the measurements/specifications database 26, the shop manual information retrieved from the shop manual database 28 and the parts information retrieved from the parts catalog database 30 can be printed on the measurements-specifications printer 14 located near the technician terminal 12. The measurements/specifications printer 14 may be housed within the ruggedized housing 40 that houses the first personal computer 38 and the first video display 34.

Once the repairs have been completed, the customer is directed to the point of sale terminal 20 whereat the cost estimate report is retrieved by the point of sale program. The cost of such repairs is automatically calculated by the second personal computer on the second video display. An invoice is generated by the point of sale program in response to the retained cost estimated report.

Once the invoice is generated, the operator of the point of sale terminal 20 directs the point of sale program (using appropriate keys on the keyboard) to print an invoice report on the point of sale printer 22 and to store the invoice in the customer/inspection database 24. The point of sale printer 22 generates a printed invoice that indicates the total price to be paid by the customer. Additional features such as check verification, automatic withdrawal from debit accounts, and/or credit card verification can also be integrated into the point of sale terminal 20. Such additional features as a part of a point of sale terminal are well known in the art and therefore are not described in detail herein.

As thus described, it is seen that the present embodiment is able to facilitate the inspection of a vehicle and the generation of the recommended/suggested services report, the generation of a cost estimate for recommended and suggested repairs, the repair of such vehicle, and the generation of an accurate and detailed invoice.

The above description of the present embodiment described a single technician terminal coupled to (or networked with) a single point of sale terminal. In one variation of the above embodiment, however, a plurality of technician terminals may be coupled to the single point of sale terminal or to a plurality of such terminals. In another variation, a plurality of point of sale terminals may be coupled to a single technician terminal. In a further variation, only the technician terminal may be utilized as a stand alone inspection station. Such stand alone inspection station may or may not perform the functions of the point of sale terminal within the first computer system.

Another variation of the present embodiment includes a central terminal from which a plurality of point of sale terminals can be accessed. The point of sale terminals can be located at remote locations, e.g., at different shop locations, and can be accessed through, e.g., analog telephone lines and modems. Upon accessing one of the point of sale terminals, the central terminal can be used to download inspection reports from the customer/inspection database associated with the accessed point of sale terminal. The central terminal can then be used to perform statistical analyses, such as frequency of repair analysis, on the inspection reports.

Figure 2:
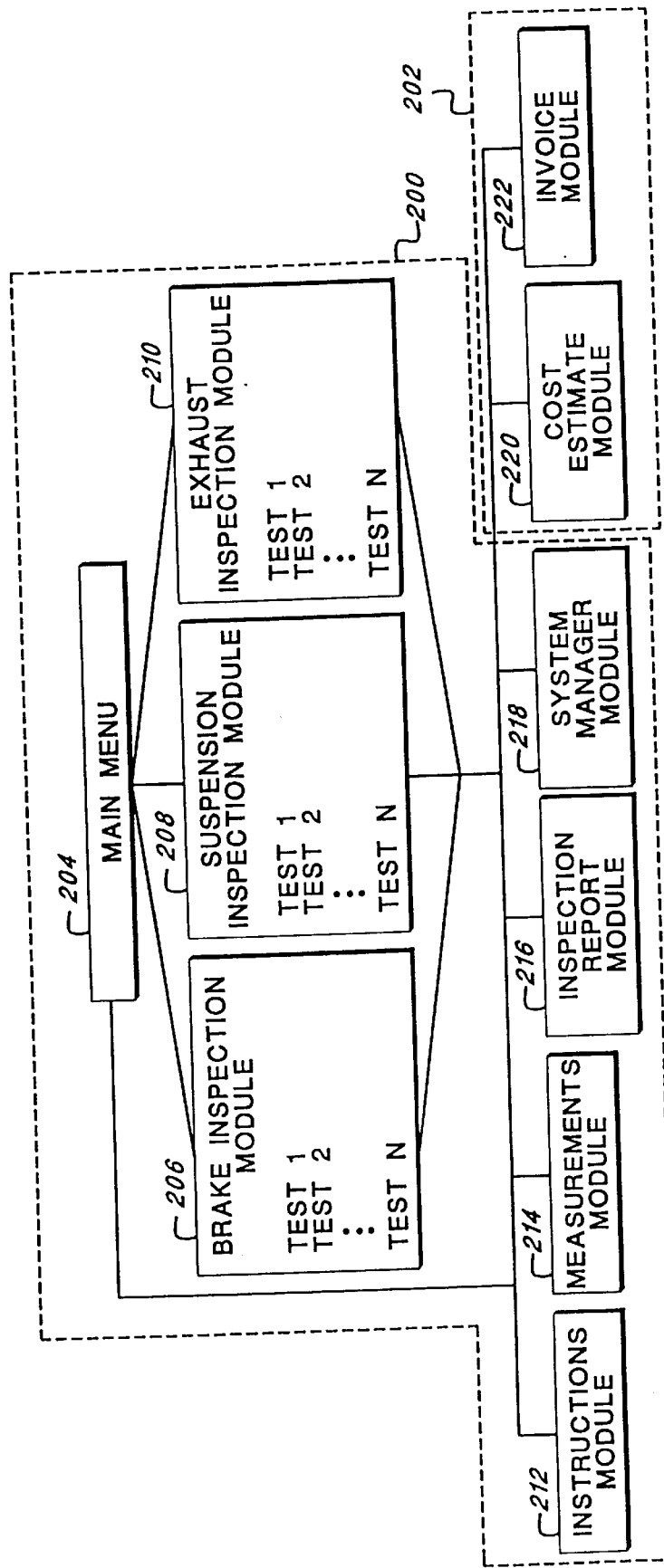
FIG. 2 is a block diagram of the modules employed in a software system utilized in the embodiment of FIG. 1.

Referring next to FIG. 2, a block diagram is shown of the modules employed in a software system utilized in the embodiment of FIG. 1. The software system is made up of the inspection program 200, the point of sale programs 202, and a database program (or database "engine") for accessing the shop manual database 28 and the measurements/specifications database 26. As illustrated, the inspection program 200 is made up of a main menu module 204, a brake inspection module 206, a suspension inspection module 208, an exhaust inspection module 210, an instructions module 212, a measurements module 214, an inspection report module 216, and a system manager module 218. The inspection program 200 may also include, for example, an air conditioning inspection module (not shown), an automatic braking system (ABS) inspection module (not shown), an engine performance inspection module (not shown), and/or a transmission inspection module (not shown). These other modules are similar to the modules described herein but are specific to the systems for which they are designed to inspect. Such other modules, as well as modules designed for inspection of system other than automobiles, e.g., trucks and tractors, home appliances, home electronics, assembly lines, boats, recreational vehicles, rental cars and the like, are well within the skill of the skilled artisan to create based on the disclosure provided herein. The main menu module 204 provides a screen display, from which the technician may select most of the other modules depicted in FIG. 2. Specifically, the technician may select the brake inspection module 206, the suspension inspection module 208 or the exhaust inspection module 210 by touching areas of the first video display 34 on which the respective modules names are printed. In addition, the measurements module 214, and the instructions module 212 can be accessed by touching areas of the first video display 34 on which the respective module names are printed. The measurements module 214 and the instruction module 212 interface with the data base program so as to retrieve and display information from the measurements/specifications database 26 and the "shop manual" database 28. The inspection report module 216 and a system manager module 218 may also be accessed from the main menu module 204 in a manner similar to that in which the previously described modules are accessed. Once a module is selected from the main menu, control of the technician terminal 34 is relinquished to the selected module.

With respect to the brake inspection module 206, the suspension inspection module 208 and the exhaust inspection module 210, control of the terminal 34 involves the presentation of a sequence of inspection screens on the first video display 34 to the technician, and the requesting of various inspection information from the technician. The inspection information is entered using the touch screen input device 36 as described herein.

With respect to the inspection report module 216, an inspection report is generated by the inspection program whenever the inspection report module 216 is selected. The inspection report, described above, includes suggested and required repairs indicated by the brake inspection module 206, the suspension inspection module 208 and/or the exhaust inspection module 210.

The system manager module 218 provides for the configuration of various system operations, and is typically not accessed by the technician on a frequent basis. In order to deter unauthorized access to the system manager module 218, a password is required.

The point of sale program 202 employs the cost estimate module 220 and the invoice module 222. The cost estimate module 220 retrieves the inspection report generated by the inspection report module and combines it with information from the databases, as described above, in order to produce a proposed cost estimate for the required and suggested services. The operator of the point of sale terminal can then be permitted to modify the proposed cost estimate by altering the prices of services, parts or labor, and/or adding or subtracting required and/or suggested services, parts and/or labor. Once an acceptable cost estimate is achieved, the cost estimate is printed out using the point of sale printer 22.

After all required and suggested services contained in the cost estimate are performed, the point of sale program 202 accesses the invoice module 222, which retrieves the cost estimate generated by the cost estimate module 220 and prepares a final invoice in response thereto. Again, the operator of the point of sale terminal 20 can be presented with the option of modifying the proposed invoice, before the invoice is printed. Such modification may include services performed by the technician, which were not originally included in the cost estimate. The invoice module also checks for compliance with local and national laws with respect to the invoice and its deviation from the cost estimate presented to and agreed to by the customer.

As thus described, the various modules and programs of the present embodiment are accessed by the technician at the technician terminal 12 or the operator at the point of sale terminal 20. The modules interact with one another so as to facilitate the inspection of the vehicle, the generation of the inspection report, the generation of the cost estimate, provision of instructions and measurements to the technician during the repair and servicing of the vehicle, and the generation of the invoice from which the customer is billed.

Figure 3:
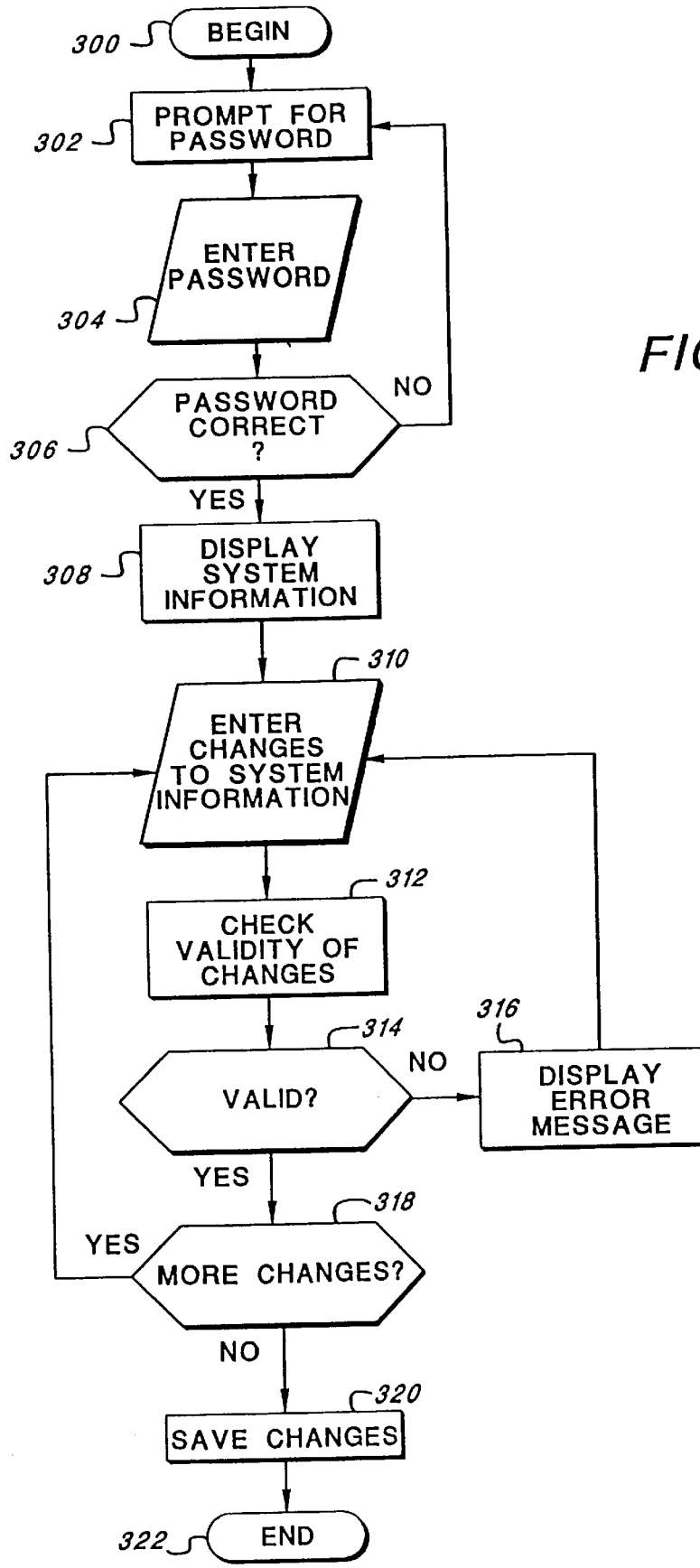
FIG. 3 is a flow chart showing the steps traversed by a system information module employed in the embodiment of FIG. 1.

Referring next to FIG. 3, a flow chart is shown of the steps traversed by a system manager module employed in the embodiment of FIG. 1.

Upon selection at the main menu (Block 300), the system manager module prompts (Block 302) the technician, or other user of the technician terminal 12, to enter a password. The password is entered (Block 304) by the technician and compared (Block 306) by the system manager module with the correct password. In the event the password is incorrect, the system manager module again prompts (Block 302) for the password. In the event however, the password is correct, system information is displayed (Block 308) on the first video display 34 and the technician or other user is provided with the opportunity to enter changes (Block 310) to the system information. As the information is entered into the technician terminal 12, the system manager module checks (Block 312) the validity of such changes. For example, the system manager module can check the appropriateness of such entries such as state, wherein a two letter state abbreviation may be required, zip code, wherein the appropriateness of the zip code may be verified (and in one variation, cross checked with the city entered into the city field). The phone number can also be checked for validity. An additional parameter that can be verified is the selection of various "paths" or locations within the technician terminal 12 at which information is stored. This checking is performed by verifying, e.g., that the paths in fact exist on a mass storage device such as a hard drive within the first computer system 38. If the information entered is invalid (Block 314), an error message is displayed (Block 316) on the first video display 34 and the opportunity is again presented (Block 310) for the technician or user to make changes to the system information. The validity of this subsequent information is again verified (Block 312). If the information entered is valid (Block 314), then the system manager module determines whether additional changes are needed (Block 318). This can be done by detecting whether or not a "done" button, i.e., an area on the first video display on which the word "done" is printed, has been touched. In the event the "done" button has been touched, any changes to the system information are saved (Block 320) within the first personal computer 38 and execution of the system manager module terminates (Block 322), returning control to the main menu module. In the event the "done" button has not been depressed (Block 318), the system provides (Block 310) the opportunity for the technician or user to enter additional changes to the system information, validity is checked (Block 312), and so forth (Blocks 314 through 322).

In this way, system information, i.e., configuration information) can be entered into the technician terminal of the present embodiment, and can similarly be modified.

Figure 4A:
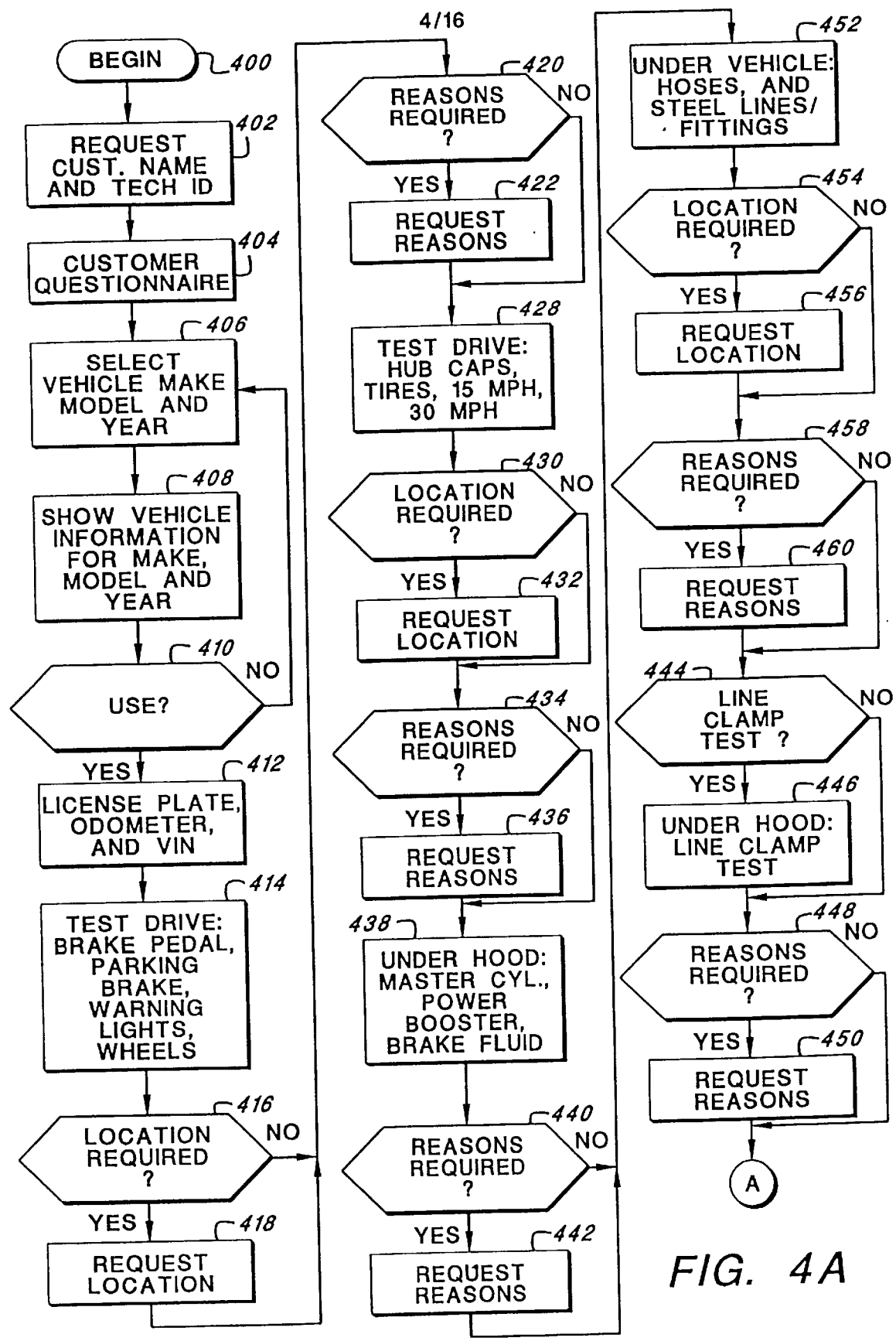
FIGS. 4A and 4B are a flow chart showing the steps traversed by a brake inspection module employed in the embodiment of FIG. 1.
Figure 4B:
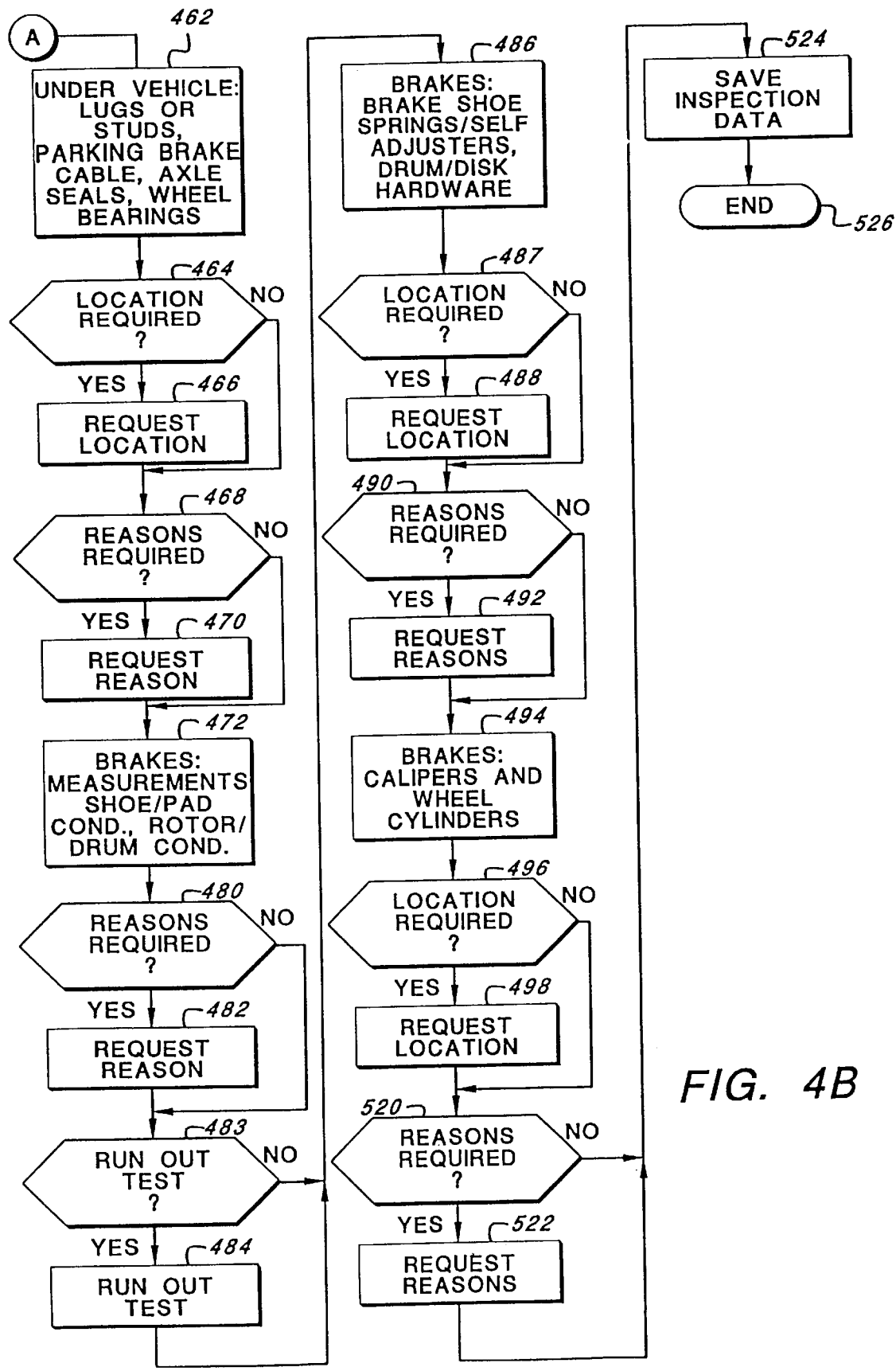

Referring next to FIGS. 4A and 4B, a flow chart is shown of the steps traversed by a brake inspection module employed in the embodiment of FIG. 1. Upon the selection of the brake inspection module, the main menu module transfers control of the technician terminal 12 to the brake inspection module (Block 400, FIG. 4A). The brake inspection module displays a screen requesting (Block 402) a customer name and technician ID for the brake inspection to be conducted.

Figure 5:
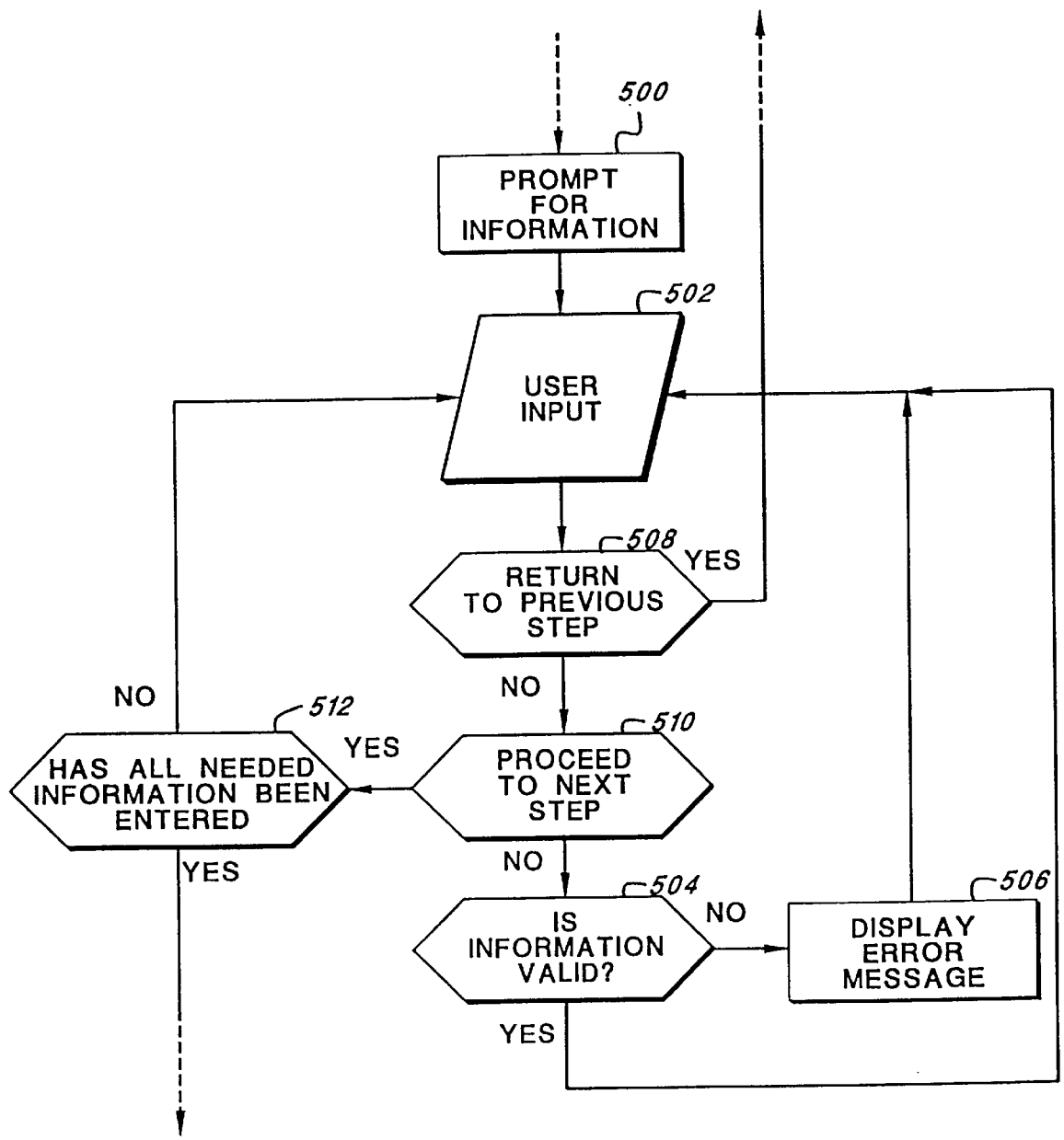
FIG. 5 is a flow chart showing the steps traversed by a user input sub-module which is executed at each user input screen of the modules shown in FIGS. 4A, 4B, 6A, 6B, 7A and 7B.

This request for information, and all such information contained within the brake inspection module, the exhaust inspection module and the suspension inspection module are performed in accordance with the information request routine (or user input routine) shown in FIG. 5. Thus, for example, when the name and technician ID are requested, a prompt is displayed (Block 500) on the first video display 34 and the opportunity for input by the technician is presented. In the event the technician inputs a customer name and technician ID (Block 502), i.e., the user did not select the return to previous step option (as determined in Block 508) or the proceed to next step option (as determined in Block 510 the validity of that information is tested (Block 504). If the information is invalid (Block 504), an error message is displayed (Block 506), with control returning to the technician opportunity for user input (Block 502).

After valid information is input into the user input routine the user input routine continues to wait until the user selects either one of two additional options displayed on every user input screen (at Block 502). The first is "return to previous step". The "return to previous step" option, if selected by the technician or user (Block 508), returns the control of the first personal computer to the previous step in the respective flowchart, e.g., the flowchart of FIGS. 4A and 4B. For example, if the technician or user presses the "return to previous step" button at the customer name and technician ID request screen (FIG. 4A, Block 402), control is returned to the main module (because there is no previous step in the brake inspection module). If the return to previous step option is not selected (as determined in Block 508), the other option that is selectable by the technician or user is the "proceed to next step" option. When this option is selected (Block 510), a check is made (Block 512) to see whether all needed information has been entered into the current input screen. In the event that some information has not been entered (Block 512), the opportunity for user input is again presented (Block 502). Alternatively, the user may be given the opportunity to skip a particular test, measurement or piece of information, which offers an advantage of being more flexible, but also risks important tests, measurements, or pieces of information being omitted. A combination of required tests, measurements and/or pieces of information and optional tests, measurements and/or information may also be implemented consistent with the teachings herein. The "proceed to next step" option will continue to return the user to the user input opportunity (Block 512) until all information needed at the particular input screen being displayed has been entered. If the "proceed to next step" option is selected (Block 510) and all information needed at the user input screen has been entered (Block 512), control passes to the next step in the flowchart, e.g., a customer questionnaire screen (FIG. 4A, Block 404).

Note that all user input screens (in FIGS, 4A, 4B, 6A, 6B, 7A and 7B) function in accordance with the user input routine shown in FIG. 5, but for the sake of conciseness, such detailed explanation of the user input routine, above, will not be repeated for each user input screen described below. It will be understood, however, by one skilled in the art that such user input routine, or a similar routine, will be traversed each time a user input screen (or inspection screen) is presented.

Next, on the customer questionnaire screen (Block 404), various questions are presented to the technician, such as "noise is", and various responses are presented, such as "constant," "only when braking," "front," "rear," and "other". Each of these questions, which represent possible customer complaints, is completed by the technician before proceeding to the next user input screen. The next user input screen prompts the technician (Block 406) for the make, model and year of the vehicle on which the inspection is to be performed. Following the selection of the make, model and year, information for the selected make, model and year is displayed (Block 408) on the first video display 34, and the technician has the opportunity to determine whether the displayed make, model and year vehicle information matches the vehicle on which he/she intends to perform service. If the displayed vehicle is not the vehicle on which the technician intends to perform service (Block 410), technician is again presented with the opportunity to select the make, model and year of the vehicle (Block 406).

Note that in the event that the make, model and year of the vehicle on which service is to be performed is not available within the present embodiment, the technician is provided with the opportunity to manually enter information on the vehicle.

Once the make, model and year information is selected and the technician is satisfied that this is the correct vehicle type (Block 410), the technician is prompted (Block 412) to enter in the license plate number and state, the odometer mileage, and the vehicle identification number for the vehicle on which the inspection is to be performed.

Note that the above-described screens (Blocks 402, 404, 406, 408, 412) may be displayed and responded to at the technician terminal 12, or, alternatively, may be displayed and responded to at the point of sale terminal 20. The point of sale terminal is preferably located near an area where customers are allowed, such as in a customer lobby or at a cashier's station, whereas the technician terminal 12 is preferably located in an area where customers are not allowed, i.e., a shop area. The inspection screens that follow (Blocks 414 et seq.) are preferably displayed and responded to at the technician terminal 12.

After the license plate, odometer and vehicle identification number information is entered (Block 412), the first inspection screen is presented to the technician (Block 414). This first inspection screen prompts the technician for information that the technician obtains after taking the vehicle on a test drive.

The first inspection screen also requests information on the brake pedal, the parking brake, the panel lights and the wheels of the vehicle. With respect to the brake pedal, the technician has the opportunity to select "low," "high," "soft," "hard," "fade," "pulsation," or "okay." With respect to the parking brake, the technician has the option of selecting "excessive travel," "inoperative," or "okay." With respect to the panel lights the technician has the opportunity of selecting "warning," "ABS," "rear brake," or "okay." With respect to wheels, the technician has the opportunity to select "custom," "damaged," "locks," "mismatch," "missing lug nuts," or "okay." The technician selects an option by touching the area of the first video display 34 at which the desired option is displayed. Depending on the particular options selected for each of the categories on this inspection screen, the technician may be prompted to enter a location of the condition (Blocks 416 and 418). For example, if the technician selects "damaged" under the wheels category, the system will prompt the technician to enter the location of the damaged wheel. After the location is entered, or in the event the location is not required by any of selected options, the system next determines whether or not any of the selected options requires that a reason be entered (Blocks 420 and 422). The only option which will not cause the system to require a location or a reason is "okay." If reasons are required, the system requests (Block 422) that such reasons be entered. Examples of reasons are: "part is close to end of its useful life", "address customer need, convenience or request", "comply with maintenance recommended by the vehicles original equipment manufacturer", "technicians recommendation based on substantial and informed experience".

After reasons are entered (as prompted in Block 422) or reasons are not required (Block 420), the next screen that is presented requests (Block 428) response in the following categories: hubcaps, tires, 15 MPH, and 30 MPH. Various options are presented below each of these categories and the technician is presented with the opportunity of selecting options for each of these categories in a manner similar to that in which the technician was able to select options for the categories brake pedal, parking brake, warning lights, and wheels. Again, the opportunity is presented (Block 430 and 432) for the technician to enter a location, if appropriate, and, similarly, the technician is requested (Blocks 434 and 436) to enter reasons for the selected options in each category, if an option other than okay is selected in any of the categories.

After a location is entered (as prompted in Block 432) or a location is not required (Block 430) and after reasons are entered (as prompted in Block 436) or reasons are not required (Block 434), the next screen display requests (Block 438) that an option be selected in each of the following categories: master cylinder, power booster and brake fluid. No location will be required for any selected response to these three categories, but the technician will be required to enter reasons if an option other than okay is selected in any of these categories (Blocks 440 and 442).

Next, after reasons are entered (as prompted in Block 442) or reasons are not required (Block 440), an inspection screen with the following categories is presented: Hoses, and steel lines/fitting (Block 452). In the event the user selects options other than okay in either of these categories, the technician will be required to enter the location (Block 454 and 456) of the problem and the reasons for the option (Blocks 458 and 460). Once the location is entered (as prompted in Block 456) or a location is not required (Block 454) and once reasons are entered (as prompted in Block 458) or reasons are not required (Block 458), the system proceeds to Block 444.

If the technician entered "leaking," "internal leaks" and/or "intermittent pedal drop" in the master cylinder category of the master cylinder/power booster/brake fluid inspection screen (Block 438), he/she will be required to perform a line clamp test following the hoses and steel lines/fittings inspection screen (Block 452). If the technician is required to perform the line clamp test (Block 444), a line clamp test screen is displayed (Block 446) providing the opportunity to enter results from the line clamp test. In the event the results are not normal (Block 448), reasons for such results are required and are requested (Block 450). If the event the results are normal, reasons are not required (Block 448) and the next screen is presented (Block 462). In the event a line cramp test is not required (Block 444), there are no reasons required (Block 448) and the next screen is presented (Block 462).

An inspection screen with the following categories is next presented: Lugs or studs, parking brake cable, axle seals and wheel bearings (Block 462, FIG. 4B). As with many of the previous categories, when non-okay options are selected in any of these categories, the technician will be required to enter in the location (Block 464 and 466) of the selected option (i.e., problem), and the reason (Block 468 and 470) for the option.

Next, after a location is entered (as prompted in Block 466) or a location is not required (Block 464) and after the reason is entered (as prompted in Block 470) or reason is not required (Block 468), the technician is prompted (Block 472) to enter measurements for the brake rotors and/or drums. Determination as to whether brake rotor measurements or brake drum measurements are to be made is determined by the technician program based on the selected make, model and year of the vehicle being inspected. A separate inspection screen is presented for each wheel of the vehicle being inspected, and categories for pad condition and/or shoe condition, and rotor condition and/or drum condition, are presented, in addition to the request for rotor and/or drum measurements. Measurements may also be taken of the brake pads and/or shoes, as needed. Options for each of the categories presented, e.g., pad conditions and rotor conditions, are selected in a manner similar to that described above.

Responses to, e.g., pad measurements and rotor measurements screen are made as follows. In another embodiment, the digital measuring instrument 16 may include a digital depth gauge. The digital depth gauge is utilized to input the inner and outer pad measurements by selecting (i.e., touching) an input box on the brake measurement selection screen. For example, when the inner pad measurement box is selected, the digital depth gauge are positioned against the inner pad. Once the digital depth gauge is against the inner pad, a button on the digital depth gauge is pressed and the measurement for the inner pad is automatically input into the inner pad measurement box on the brake inspection screen. Similarly, the outer pad measurement is recorded and the rotor dimension is also recorded. A suitable digital depth gauge is available as the "Ultra Cal Mark 3" from Fred V. Fowler Company of Massachusetts. Alternatively, the pad measurements (or other measurements, such as rotor and/or drum measurements) analogous can be entered manually using an on-screen keyboard. Once the pad dimensions and rotor dimensions are recorded, the system will request that the technician enter reasons for the selected option in the pad condition category, and/or the selected option in the rotor condition category in the event an option other than okay is selected (Blocks 480 and 482). Note that because a separate inspection screen is presented for measurements associated with each wheel of the vehicle, the location of the selected option for pads/shoe condition and/or rotor/drum condition is not requested.

After any reasons are entered (as prompted in Block 482), as required or reasons are not required (Block 480), the system determines (Block 483) whether a run-out test is needed. A run out test will be required if the "pulsation" option is selected in the brake pedal category above (Block 414, FIG. 4A). If a run out test is required, the screen will prompt the technician to conduct the run out test and enter any results or reasons (Block 484). The run out test may be performed manually, as is known in the art, or may be performed using a digital dial indicator, such as the "Ultra Digit Mark 4" from Fred V. Fowler Company of Massachusetts.

After the run out test, or in the event that no run out test is required, an inspection screen with the following categories is presented: Brake shoe springs/self-adjusters, drum/disk hardware (Block 486). In the event an option other than okay is selected for either the brake shoe spring/self-adjusters category or the drum/disk hardware category, the technician is required to enter into the technician terminal the location of the selected option (i.e., problem) (Block 487 and 488). The technician is also required to enter the reason for the selected option into the technician terminal in the event that an option other than okay is selected for either of the above categories (Block 490 and 492).

Next, after a location is entered (as prompted in Block 488) or a location is not required (Block 487) and after a reason is entered (as prompted in Block 492) or a reason is not required (Block 490), the inspection program displays an inspection screen with the following categories: calipers and wheel cylinders (Block 494). As with many of the above-described inspection steps, in the event that an option other than okay is selected for either of the categories, the technician is required to enter in a location for the option (Blocks 496 and 498) as well as a reason for the option (Block 520 and 522).

Following the calipers and wheel cylinders inspection screen, i.e. after a location is entered (as prompted in Block 498) or a location is not required (Block 496) and after reasons are entered (as prompted in Block 522) or reasons are not required (Block 520), the inspection results are saved (Block 524) within the first personal computer 38 of the technician terminal, and control is returned (Block 526) to the main menu module.

Figure 6A:
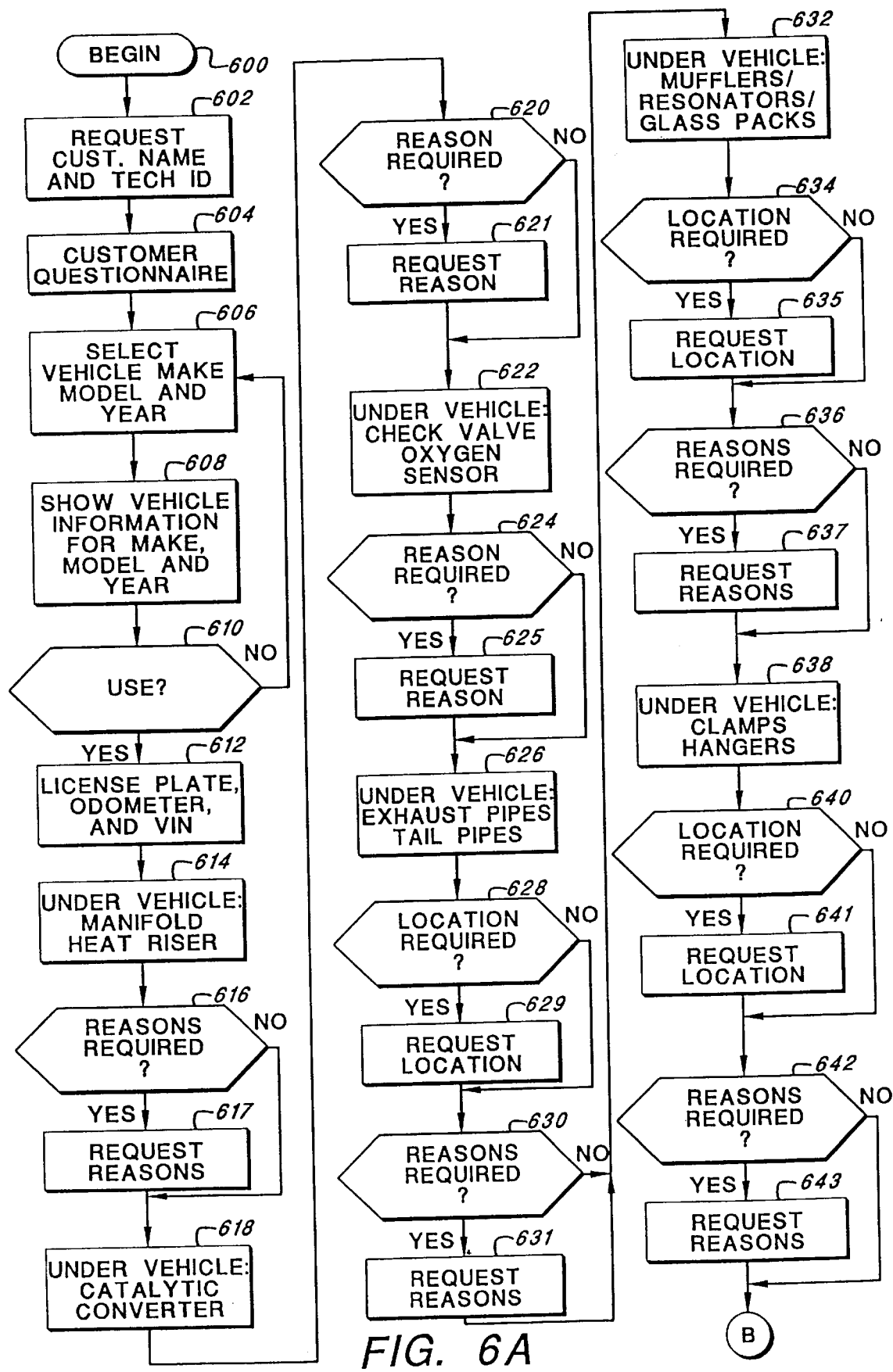
FIGS. 6A and 6B are a flow chart showing the steps traversed by an exhaust inspection module employed in the embodiment of FIG. 1.
Figure 6B:
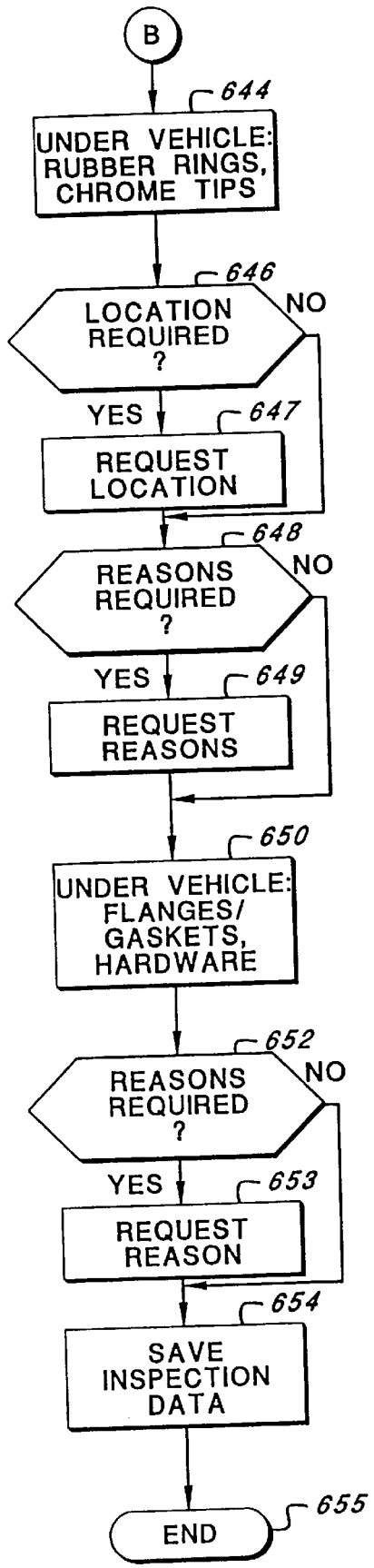

Referring next to FIGS. 6A and 6B, a flow chart is shown of the steps traversed by an exhaust inspection module employed in the embodiment of FIG. 1. Initially (Block 600), as with the brake inspection module, the exhaust inspection module displays (Block 602, FIG. 6A) an input screen that requests the customer name and technician ID. Next, the exhaust inspection module displays (Block 604) the customer questionnaire, also described above, and then displays (Block 606) a screen into which the technician enters the make, model and year of the vehicle. After the selection of the make, model and year of the vehicle, the exhaust inspection module displays (Block 608) information regarding the make, model and year of the vehicle and presents the technician with the opportunity to use the selected make, model and year, or to reelect a different make, model and year (Block 610). In the event the technician decides not to use the information displayed in Block 608, e.g., reelect a different make, model and year, the technician indicates so at Block 610 and is returned to the screen of Block 606.

Note that in the event the particular make, model and year of the vehicle that the technician is to inspect is not available within the exhaust inspection module, the technician is given the opportunity to enter the information on the particular make, model and year to be inspected. In this case, a make, model and year are manually entered.

After selecting (or manually entering) the make, model and year, the technician is presented with a screen that requests (Block 612) the license plate number and state, the odometer mileage and the vehicle identification number. Note that, as in the brake inspection module, the above-described screens (Blocks 602, 604, 606, 608, 612) may be displayed and responded to at the technician terminal 12, or, alternatively, may be displayed and responded to at the point of sale terminal 20. The inspection screens described hereinbelow (Blocks 614 et seq.) are preferably displayed and responded to at the technician terminal 12.

Following the entry of the license plate, odometer and vehicle identification number information, the technician is prompted (Block 614) with a screen listing two categories: manifold and heat riser. The technician is required to select an option within each of these categories, and in the event the option is an option other than okay, the technician is required to enter a reason for the selection of the option (Blocks 616 and 617).

Next, after a reason is entered (as prompted in Block 617) or a reason is not required (Block 616), the technician is presented (Block 618) with the catalytic converter category screen. As with the previous screen, if the technician selects an option under the catalytic converter category other than okay, the technician is required to enter a reason for the selection (Blocks 620 and 621). After the reason is entered (as prompted in Block 621) or a reason is not required (Block 620), the next screen presented (Block 622) to the technician includes the check valve and oxygen sensor categories. A reason must be entered in the event an option other than okay is selected for either the check valve or oxygen sensor category (Blocks 624 and 625). After a reason is entered (as prompted in Block 625) or a reason is not required (Block 624), the technician is next presented (Block 626) with an inspection screen that includes exhaust pipe and tail pipe categories. In the event an option other than okay is selected for either the exhaust pipe or tail pipe, the technician is required to enter the location of the indicated option (i.e., problem) (Blocks 628 and 629) and is then required to enter a reason for the selected option (Blocks 630 and 631).

After a location is entered (as prompted in Block 629) or a location is not required (Block 628) and after reasons are entered (as prompted in Block 631) or reasons are not required (Block 630), the next inspection screen with which the technician is presented (Block 632) is the muffler/resonator/glass packs screen. In the event the technician indicates a problem with the mufflers, resonators or glass pacts, the technician is required to enter a location of the problem (Blocks 634 and 635) and the reason for the problem (Blocks 636 and 637).

Next, after a location is entered (as prompted in Block 635) or a location is not required (Block 634) and after the reason is entered (as prompted in Block 637) or a reason is not required (Block 636), the technician is presented with a screen that includes the following categories: Clamps and hangers (Block 638). In the event their is a problem with either the clamps or the hangers, the technician selects an appropriate option in the clamps and/or hangers category. The technician will then be required to enter in the location of the problem (Blocks 640 and 641) and the reason for selecting the problem (Blocks 642 and 643), unless the option selected for both categories is okay. After a location is entered (as prompted in Block 641) or a location is not required (Block 640) and after a reason is entered (as prompted in Block 643) or a reason is not required (Block 642), the technician is then presented with an inspection screen with the following categories: Rubber rings and chrome tips (Blocks 644, FIG. 6B). The technician is required to select an option for each of these categories and in the event the option is other than okay, the technician is required to enter the location of the problem (Blocks 646 and 647) and the reason for the problem (Blocks 648 and 649).

Next, after the location is entered (as prompted in Block 647) or a location is not required (Block 646) and after a reason is entered (as prompted in Block 549) or a reason is not required (Block 648), the technician is presented (Block 650) with an inspection screen with a flanges/gaskets category and a hardware category. The technician is required to enter into the inspection screen an option for each of these categories and in the event an option other than okay is selected, the technician is required to enter the reason for the selection (Blocks 652 and 653). Following the exhaust inspection, i.e., after a reason is entered (as prompted in Block 653) or a reason is not required (Block 652), the inspection data entered into the inspection screens is saved (Block 654) into the first personal computer system within the technician terminal and control is returned (Block, 655) to the main menu module.

Figure 7A:
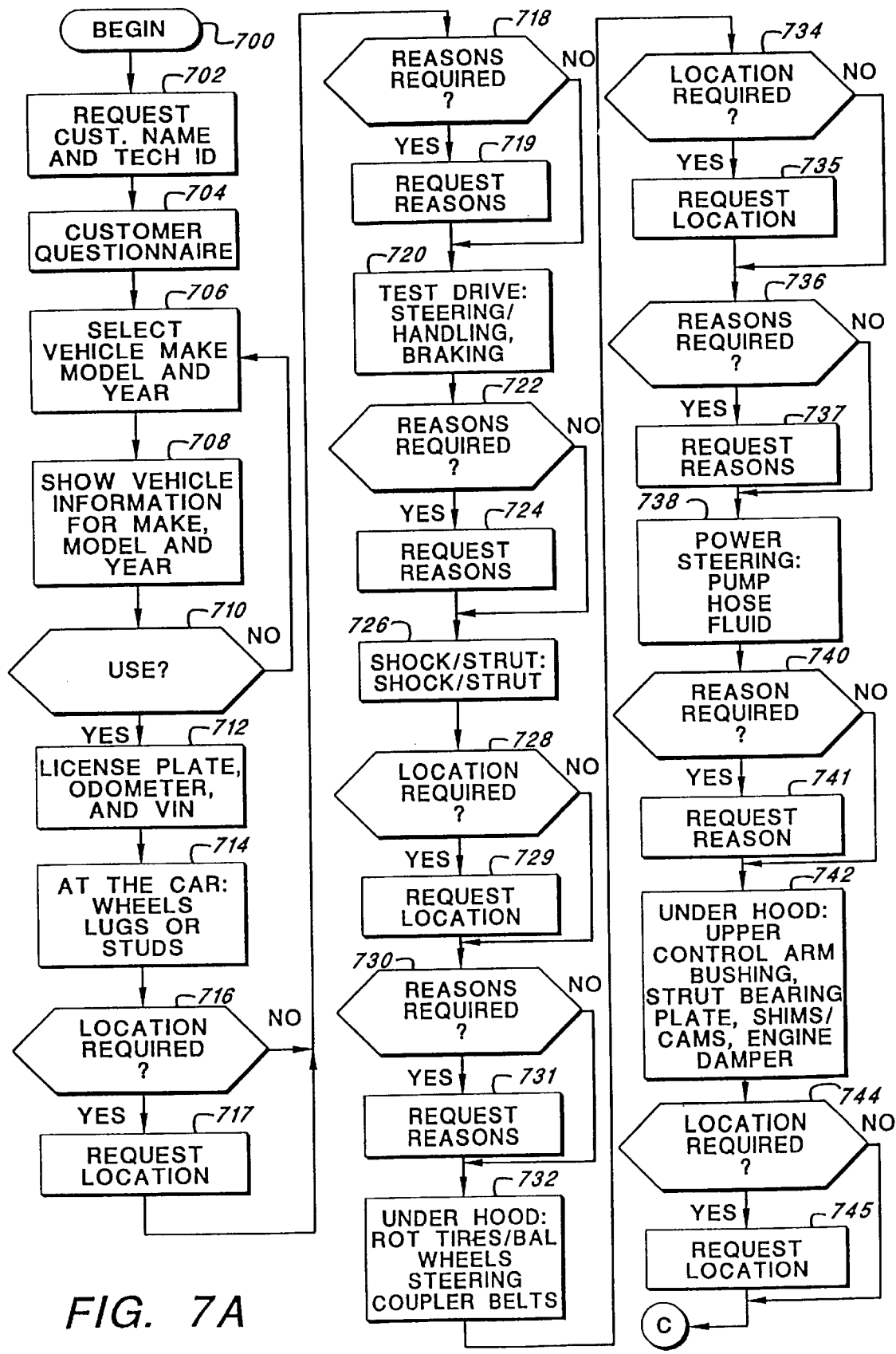
FIGS. 7A and 7B are a flow chart showing the steps traversed by a suspension inspection module employed in the embodiment of FIG. 1.
Figure 7B:
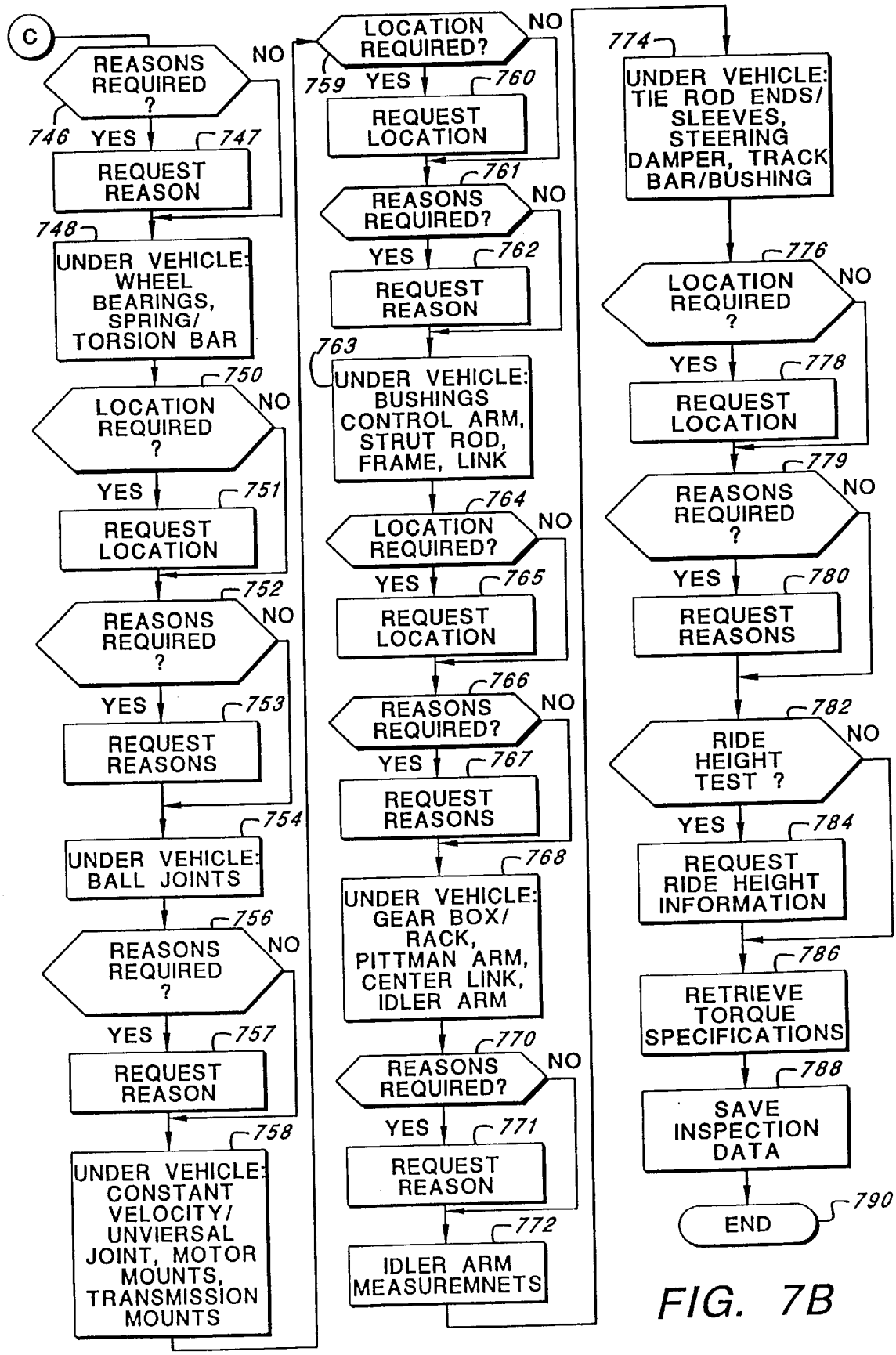

Referring next to FIGS. 7A and 7B, a flow chart is shown of the steps traversed by a suspension inspection module employed in the embodiment of FIG. 1.

After selection at the main menu module, the suspension inspection module is executed (Block 700, FIG. 7A) and an information screen is presented (Block 702) requesting the customer name and technician ID. After the customer name and technician ID are input to the suspension inspection module, the customer questionnaire, described above, is displayed and completed (Block 704) by the technician. Next, the make, model, and year of the vehicle are selected (Block 706) and information regarding the vehicle is displayed (Block 708) on the first video display. The technician is then presented with an option (Block 710) to use the information displayed or to re-select the make, model, and year of the vehicle. In the event the technician decides not to use the information, e.g., re-elect the make, model and year of the vehicle, the technician indicates so in response to Block 710 and is returned to the screen of Block 706. In the event the make, model, and year of the vehicle being inspected are not among the selectable makes, models or years, the technician has the opportunity to manually enter the make, model, and year of the vehicle along with information regarding the vehicle, such as vehicle specifications and measurements. Next, the technician is asked (Block 712) to enter the license plate number, state, odometer mileage, and vehicle identification number for the vehicle on which the inspection is to be performed. Note that, as in the brake inspection module, the above-described screens (Blocks 702, 704, 706, 708, 712) may be displayed and responded to at the technician terminal 12, or, alternatively, may be displayed and responded to at the point of sale terminal 20. The inspection screens described hereinbelow (Blocks 714 et seq.) are preferably displayed and responded to at the technician terminal 12.

After entry of the license plate, odometer mileage, and vehicle identification number, the first inspection screen is displayed (Block 714) on which the categories wheels, and lugs or studs are displayed. The technician is required to select an option for each of these two categories, and in the event an option other than okay is selected the technician is required to enter the location of the option (i.e., problem) (Blocks 716 and 717) and the reason that the option was selected (Blocks 718 and 719). After a location is entered (as prompted in Block 717) or a location is not required (Block 716) and after a reason is entered (as prompted in Block 719) or a reason is not required (Block 718), the next suspension inspection screen display lists categories relating to information gathered by the technician during a test drive (Block 720). The categories are steering/handling and braking. In the event the technician selects an option for either of these categories other than okay, the technician is required to enter the reasons for selecting the option (Block 722 and 724).

Next, after reasons are entered (as prompted in Block 724) or reasons are not required (Block 722), an inspection screen is displayed (Block 726) requesting information regarding the shocks and/or struts. Again, the technician is required to enter the location of the problem (Blocks 728 and 729) and the reason for selecting the option (i.e., problem) (Blocks 730 and 731), in the event the option selected is other than okay. After a location is entered (as prompted in Block 729) or a location is not required (Block 728) and after a reason is entered (as prompted in Block 731) or a reason is not required (Block 730), the technician is next directed to inspect the following categories: rotation of the tires/balancing of the wheels, steering and coupler belts (Block 732). In the event an option other than okay is selected in any of the categories, the location must be entered of the problem associated with the option selected (Block 734 and 735), and a reason indicated for selecting the option (Block 736 and 737).

Next, after a location is entered (as prompted in Block 735) or a location is not required (Block 734) and after a reason is entered (as prompted in Block 737) or a reason is not required (Block 736), an inspection screen relating to the power steering system is displayed (Block 738). This inspection screen has the categories of pump, hose and fluid, if an option other than okay is selected in any of these categories the technician is required to enter a reason for having selected such option (Blocks 740 and 741). After the reason is entered (as prompted in Block 741) or a reason is not required (Block 740), the technician is then directed to the following categories: control arm bushing, strut bearing plate, shims/cams, and engine damper (Block 742). In the event an option other than okay is selected under any of these categories, location of the problem associated with the option must be indicated (Blocks 744 and 745) and a reason for selecting the option must be selected (Blocks 746 and 747).

After a location is entered (as prompted in Block 745) or a reason is not required (Block 744) and after the reason is entered (as prompted in Block 747) or a reason is not required (Block 746), the next inspection screen presented has the categories of wheel bearings, and spring/torsion bar (Block 748, FIG. 7B). As with many of the options above, in the event the technician selects an option other than okay in either of these categories the technician is required to specify the location of the problem associated with the option (Blocks 750 and 751), and the reason for selecting the option (Blocks 752 and 753). Subsequently, after the location is entered (as prompted in Block 751) or a location is not required (Block 750) and after the reason is entered (as prompted in Block 753) or a reason is not required (Block 752), the technician is next directed to inspect the ball joints (Block 754) and in the event an option other than okay is selected is required to specify a reason for selecting the selected option (Blocks 756 and 757).

Next, after the reason is entered (as prompted in Block 757) or a reason is not required (Block 756), an inspection screen listing the following options is displayed: constant velocity/universal joint, motor mounts, and transmission mounts (Block 758). In the event an option other than okay is selected in any of these categories the technician may be required to enter location, if appropriate (Blocks 759 and 760), and is required to enter the reason for selecting the option (Blocks 761 and 762).

Next, after the location is entered (as prompted in Block 760) or a location is not required (Block 759) and after the reason is entered (as prompted in Block 762) or a reason is not required (Block 761), the technician is presented with an inspection screen with the categories of bushings, control arm, strut rod, frame, and link (Block 763). Again, in the event the technician selects an option other than okay for any of these categories, the technician will be required to enter a location for the problem associated with the option, if appropriate (Block 764 and 765), and to specify the reasons for selecting the option (Blocks 766 and 767). After the location is entered (as prompted in Block 765) or a location is not required (Block 764) and after the reasons are entered (as prompted in Block 767) or reasons are not required Block 766), the next inspection screen that is presented to the technician includes the following categories: gear box/ rack, pitman arm, center link, and idler arm (Block 768). In the event an option other than okay is selected in any of these categories the technician is required to enter the reason for selecting such option (Blocks 770 and 771).

Next, after the reason is entered (as prompted in Block 771) or a reason is not required (Block 770), the suspension inspection module causes an inspection screen to be displayed (Block 772) requesting idler arm measurements on the vehicle being inspected. The technician takes these measurements in a conventional manner, or may use a digital measuring instrument analogous to the dual-action digital calipers described herein. The technician is next presented with an inspection screen on which he/she must select an option in each of the following categories: tie rod end/ sleeves, steering damper, and track bar/bushing (Block 774). In the event an option other than okay is selected in any of these categories the suspension inspection module will require that the technician enter the location of the problem associated with the option, if appropriate (Blocks 776 and 778), and the reason for selecting the option (Blocks 779 and 780).

Next, after the location is entered (as prompted in Block 778) or a location is not required (Block 776) and after the reason is entered (as prompted in Block 780) or a reason is not required Block 779), the suspension inspection module determines whether a ride height test needs to be performed (Block 782). This determination is made based upon whether certain options were selected during certain of the inspection screens previously presented. Specifically, in the event any of the following options were selected in the shock/strut category the ride height test will be required: bent/damaged piston rods, broken/damaged/missing HW, dented, SAG, binding, cracked/torn/missing boot/dust C., missing, or leaking. In addition, the ride height test will be required if any of the options were selected in the pump, hose, and/or fluid categories other than sector shaft seal leak. During the ride height test, the technician will select the location of the tire at which ride height is to be measured, an inspection screen will be displayed for the selected tire, and the manufactures specifications will be displayed in a box on the inspection screen (Block 784). Another box will be displayed into which the technician is to input the measured ride height (Block 784). Typically, these ride height measurements are entered manually using an on-screen keyboard. The ride height measurements are made using a conventional tool to find the center of the wheel, such as is available from MOOG of Missouri, and a measuring tape to measure the distance from the center of the wheel to the wheel well. Alternatively, a digital measuring instrument, analogous to the dual action digital calipers, described herein, may be used in lieu of conventional manual instruments in order to measure the ride height for each tire. After each tire ride height information is measured, or in the event the ride height test is not required Block 782, torque specifications for the vehicle being inspected are retrieved (Block 786) from the measurements/specifications database 26 for later use by the technician. The torque specifications are printed as a part of the inspection report, when it is printed as described hereinbelow. After the torque specifications are retrieved, the suspension inspection module proceeds to save the inspection data (Block 788) input during each of the inspection screens above, and the retrieved torque specifications; and control is returned to the main menu module (Block 790).

Figure 8:
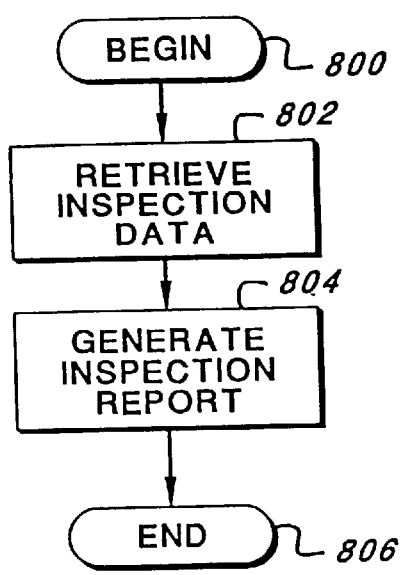
FIG. 8 is a flow chart showing the steps traversed by an inspection report module employed in the embodiment of FIG. 1.

Referring next to FIG. 8, a flow chart is shown of the steps traversed by an inspection report module employed in the embodiment of FIG. 1. Following any of the inspection modules described above, the technician may select "print report" from the main menu screen of the Main Menu Module. When "print report" is selected (Block 800), inspection data for the immediately preceding inspection module is retrieved (Block 802) from the first personal computer 38. Based on this inspection data, the inspection report module automatically generates (Block 804) an inspection report based on the options selected for each of the categories on the inspection screen and control is returned (Block 806) to the main menu module. The inspection report is displayed on the first video display 34 of the technician terminal 12. After such display, the technician has the option of printing an inspection report to the recommended/suggested services report printer 18. Generally, this report will then be presented to the customer/ owner of the vehicle for consideration. The inspection report indicates any repairs that are required, and lists an explanation for such repairs, and also indicates any repairs that are suggested and an explanation for such repairs. A diagram is advantageously printed on the face of the inspection report below the lists of required and suggested repairs so that the customer may easily determine what parts of the inspected system are in need of servicing or replacement. In this way, a comprehensive inspection report is automatically generated and presented to a customer based on accurately and systematically obtained inspection data obtained from the above described inspection modules.

Figure 9:
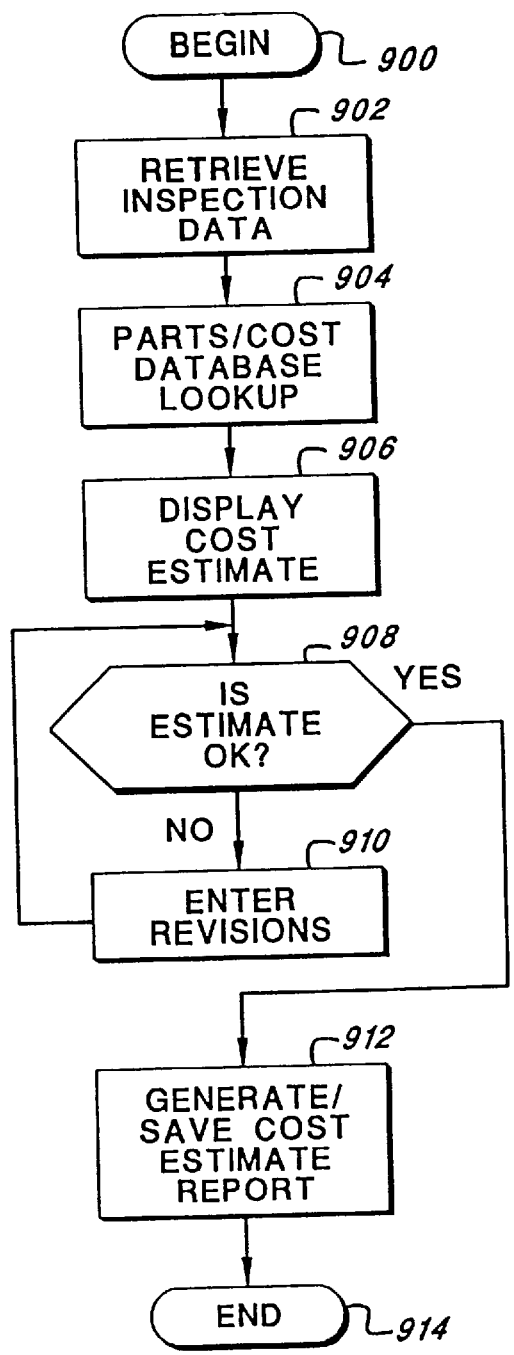
FIG. 9 is a flow chart showing the steps traversed by a cost estimate module employed in the embodiment of FIG. 1.

Referring next to FIG. 9, a flow chart is shown of the steps traversed by a cost estimate module employed in the embodiment of FIG. 1. After the customer has elected those suggested services that he/she would like to have performed, and authorizes the performance of the required services, a cost estimate can be generated at the point of sale terminal. Note that generally the shop at which the present embodiment is utilized will not be willing to perform service on the vehicle unless all of the required inspection items can be repaired. This is because the vehicle may be unsafe for operation unless these required services are performed.

Once the cost estimate module is selected (Block 900) at the point of sale terminal, the inspection data for a particular vehicle is retrieved (Block 902). Such retrieval is done by searching the stored inspection data (stored in the customer/ inspection database) based on, e.g., customer name, vehicle license plate number, or vehicle identification number. The inspection data is combined automatically with required parts and labor, and the cost of such parts and labor (Block 904). In addition, the cost estimate module automatically generates an estimate for the cost of services associated with each of the authorized required and suggested repairs, and the cost estimate is displayed (Block 906) on the second video display at the second personal computer. The operator of the point of sale terminal 20 is asked by the cost estimate module to verify the displayed cost estimate (Block 908). In the event the operator wishes to make changes to the displayed cost estimate he/she may indicate his/her desire to do so, and may then enter any desired revisions to the displayed cost estimate (Block 910). If the operator says that the estimate is okay, a final cost estimate is generated and saved (Block 912) at the point of sale terminal 20 and control is returned (Block 914) to the main menu module. The cost estimate can also printed on the point of sale printer 22, and will generally be signed by the customer to indicate his/her authorization of the indicated repairs and associated cost. In this way, an integrated system is provided for generating a cost estimate based directly on inspection data, which is systematically generated during one or more of the above described inspection modules.

Figure 10:
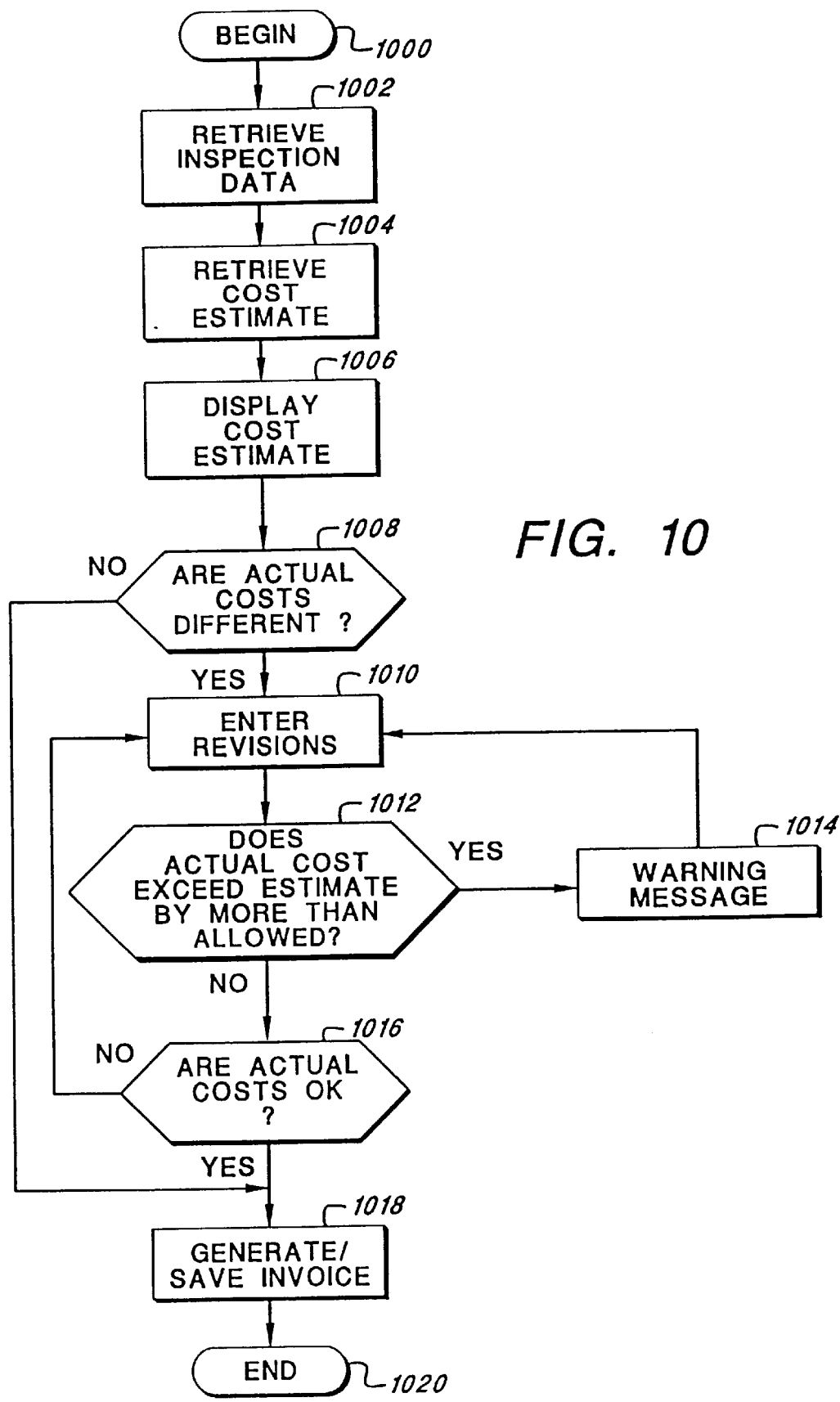
FIG. 10 is a flow chart showing the steps traversed by an invoicing module employed in the embodiment of FIG. 1.

Referring next to FIG. 10, a flow chart is shown of the steps traversed by an invoicing module employed in the embodiment of FIG. 1. After authorized required and suggested repairs are performed on the vehicle (Block 1000), inspection data is retrieved (Block 1002) from the first personal computer system 12 (which stores the customer/inspection database 24) by an invoicing module executing on the second personal computer system. The inspection data is retrieved through a network that coupled the first personal computer to the second personal computer. The network may be a peer-to-peer network, such as WINDOWS FOR WORKGROUPS available from MICROSOFT of Washington, or a client-server network, such as NETWARE available from NOVELL, Utah, such as is known in the art. In addition, the cost estimate generated by the cost estimate module is retrieved (Block 1004) and displayed (Block 1006). Next, in a preferred embodiment, no prompt is made for the operator to indicate that actual costs differ from the printed estimate. Instead, the invoicing module automatically proceeds to generate and save the invoice, as described below (Block 1018). In an alternative embodiment, the operator of the point of sale terminal 20 is prompted (Block 1008) with whether the actual costs differ from the cost estimate. In the event the actual cost do differ from the cost estimate, the operator is given the opportunity to enter these revisions (Block 1010), which are subsequently compared to the cost estimate to determine whether they exceed the cost estimate by more than is allowed by local laws and regulations (Block 1012). In the event the actual costs do exceed the cost estimate by more than is allowed, a warning message is displayed (Block 1014) and the operator is required to enter further revisions. In the event the actual costs do not exceed the estimate by more than is allowed, the operator is asked to verify that the actual cost are okay (Block 1016), and permitted to enter further revisions (Block 1010 et seq.) in the event they are not. In the event the actual costs are not different from the cost estimate, or in the event the actual costs are entered and verified as okay by the operator of the point of sale terminal, a final invoice is generated (Block 1018) by the point of sale module, and is saved (Block 1018) to the customer/inspection database 24. The generated final invoice can then printed to the point of sale printer 22 and can be presented to the customer for payment. Following the generation of the final invoice (Block 1020), control is returned to the point of sale program, which allows additional cost estimates or invoices to be generated for other vehicles and customers. In this way, a final invoice is systematically generated by the present embodiment based upon inspection data and a cost estimate for a particular vehicle.

Figure 11:
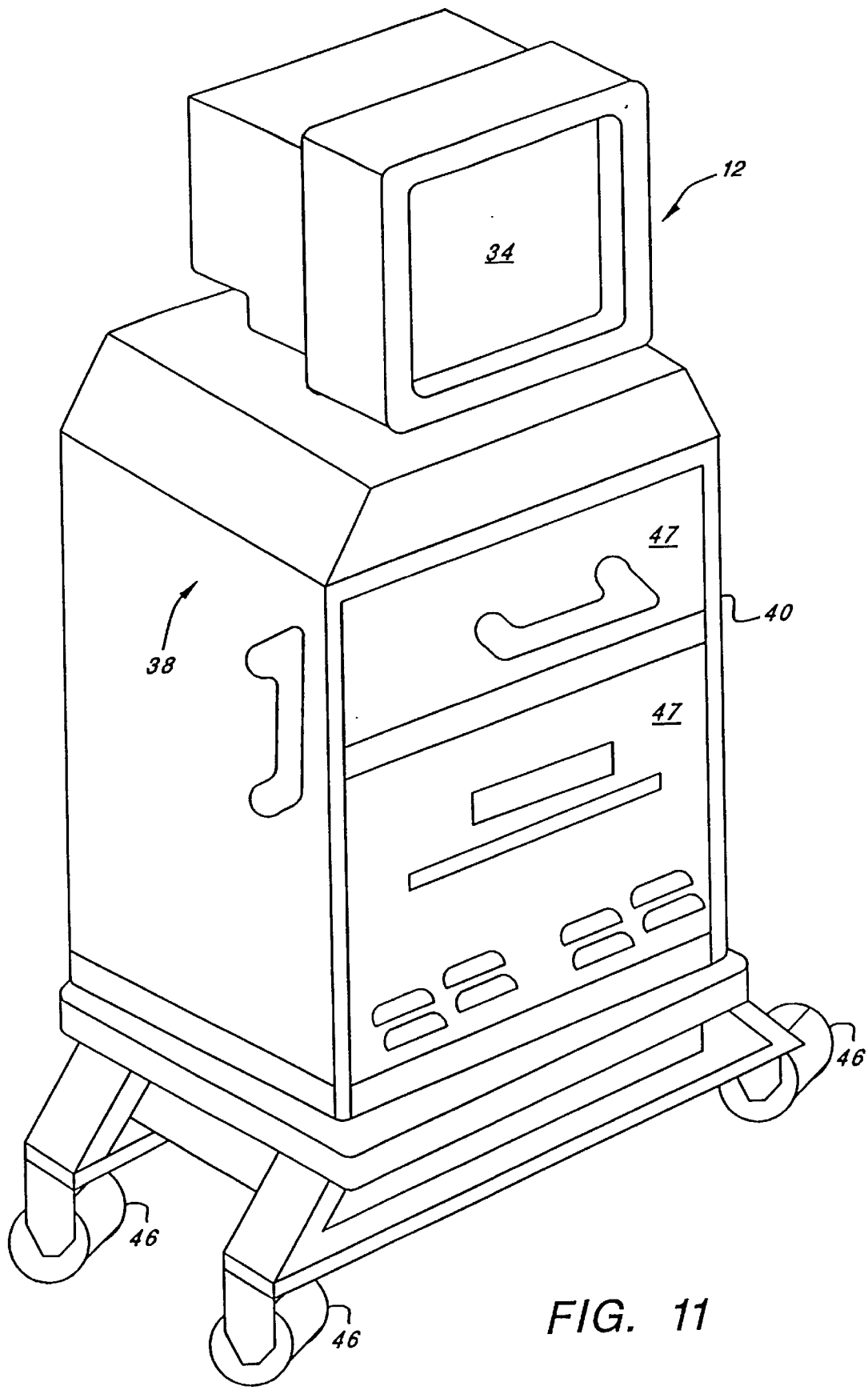
FIG. 11 is a perspective view of a technician terminal shown schematically FIG. 1.

Referring next to FIG. 11, a perspective view of a technician terminal employed in the embodiment of FIG. 1 is shown. The technician terminal 12 includes the first video display 34 mounted on top of the ruggedized housing 40. The ruggedized housing is preferably made from steel and is mounted on wheels or casters 46 to as to facilitate movement of the technician terminal within a shop by a technician. The ruggedized housing encloses the first personal computer 38 and provides several drawers 47 into which the digital measuring instrument 16 can be put for storage. In addition, the several drawers 47 preferably contain all of the tools necessary to perform a specific inspection, e.g., a brake inspection, so that the technician terminal 12 is a self-contained inspection station—containing the first personal computer, modified with an inspection module, along with all of the tools needed to perform the inspection. The drawers 47 may be specifically formed with compartments to contain the needed tools.

The first video display 34 is fitted with the touch screen interface 36, and the inspection program, which modifies the first personal computer 38 is designed to accept all needed input through the touch screen interface, thereby eliminating the need for a conventional keyboard. Advantageously, the touch screen interface provides a mechanism whereby a technician can easily input information into the technician terminal without the need for a clumsy and fragile keyboard. The touch screen interface may be a pressure gauge-type touch screen available as model number 7557 from IBM of New York. As an alternative to the touch screen interface, a light pen interface may be used, such as are known in the art, or any other suitable input device, such as a keyboard, a mouse or the like.

Figure 12:
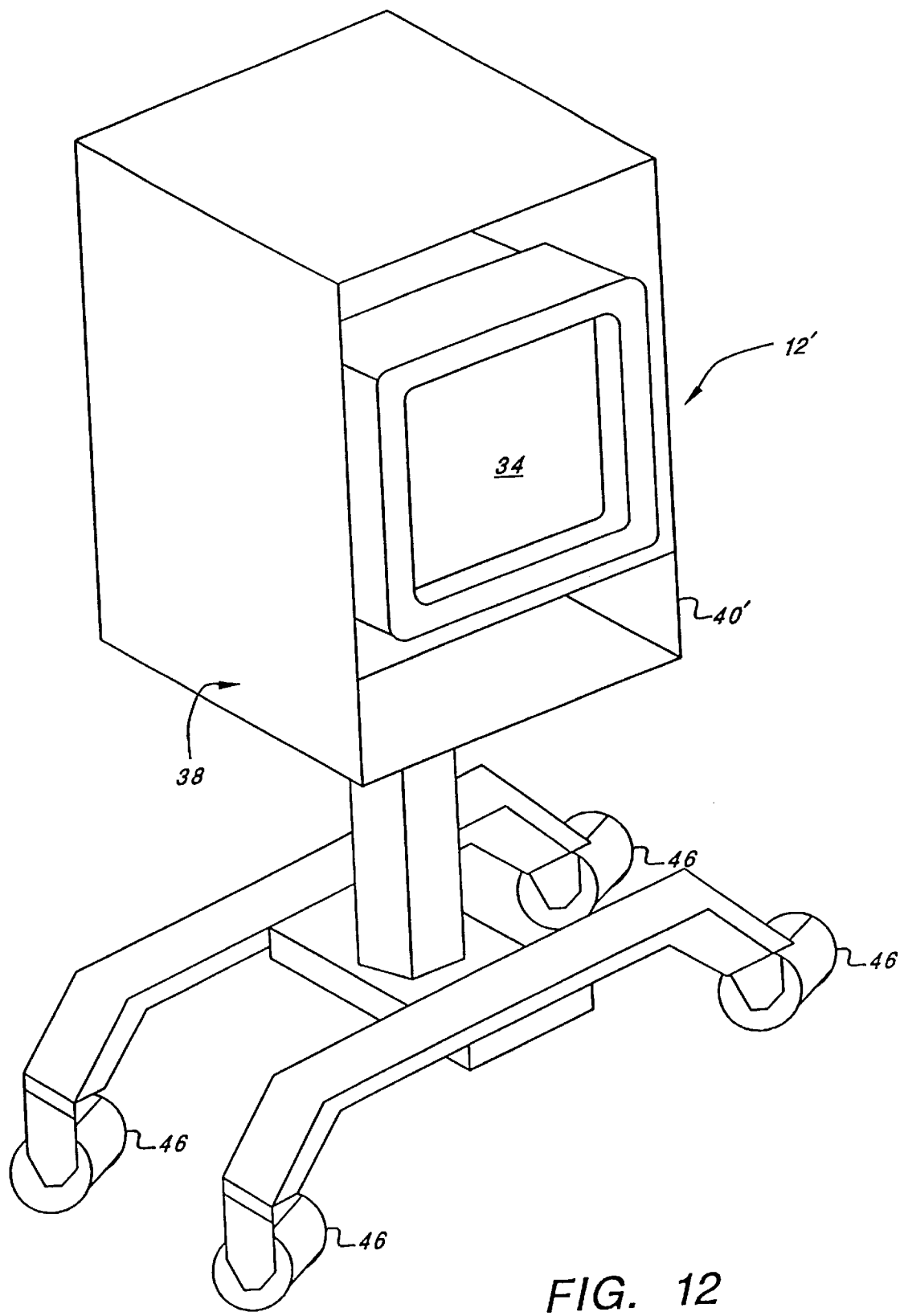
FIG. 12 is a perspective view of an alternative technician terminal to the technician terminal shown schematically in FIG. 1.

Referring to FIG. 12, a perspective view is shown of an alternative technician terminal to the technician terminal shown schematically in FIG. 1. The alternative technician terminal 12' includes the first video display 34 mounted within an alternative ruggedized housing 40'. The ruggedized housing 40' is preferably made from steel and is mounted on wheels or casters 46 so as to facilitate movement of the technician terminal within a shop by a technician. The ruggedized housing encloses the first personal computer 38. The first video display 34 is fitted with the touch screen interface, as described above.

Figure 13:
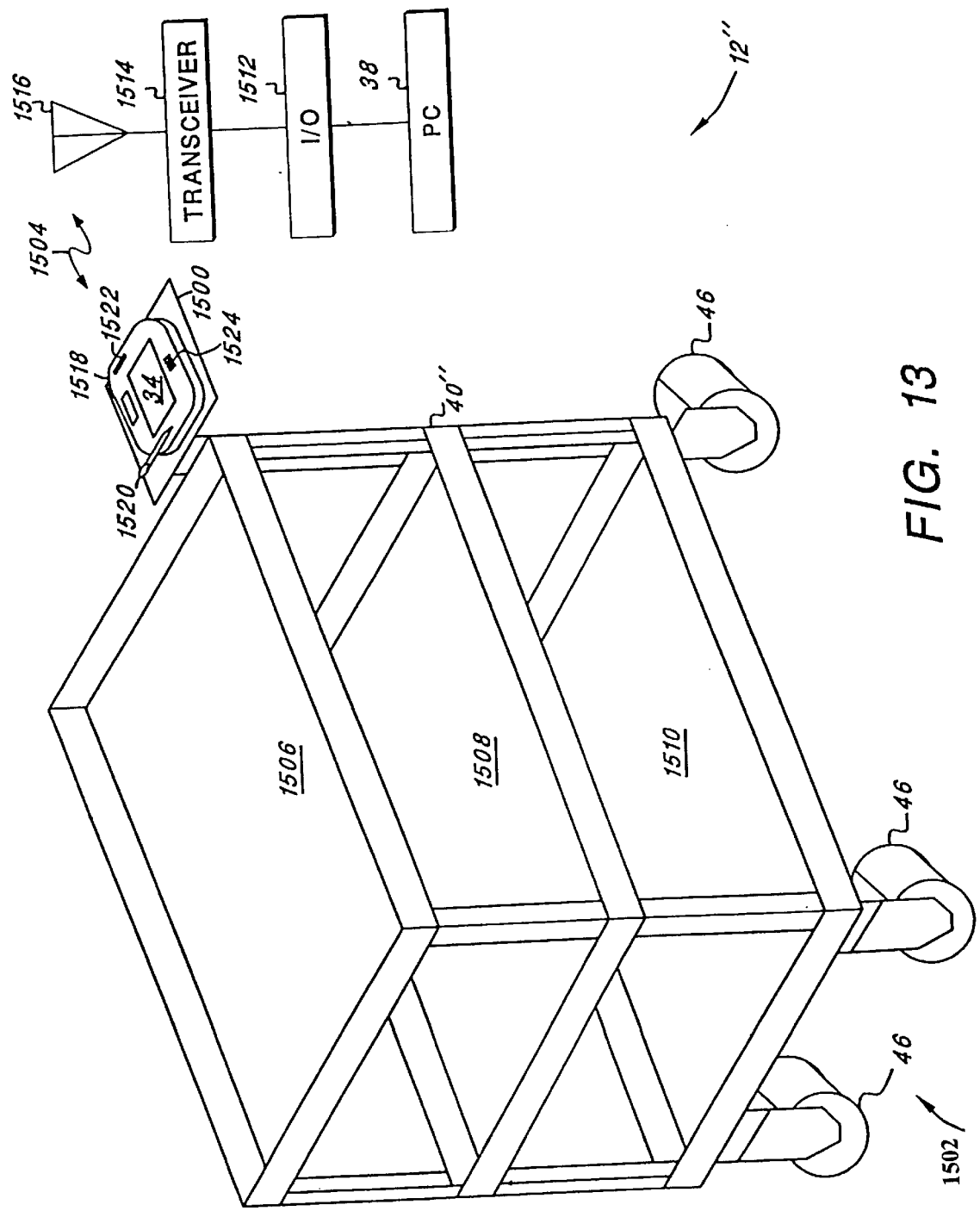
FIG. 13 is a perspective view of a preferred implementation of the technician terminal employing a wireless remote interface.

Referring next to FIG. 13, a perspective view is shown of a further alternative technician terminal employing a wireless remote interface. The technician terminal 12" includes the first video display 34 mounted on a support arm 1500, which is bolted to the side of a metal cart 1502. The metal cart 1502 is preferably made from steel and is mounted on wheels or casters 46 so as to facilitate movement of the metal cart 1502 and the first video display 34 within a shop by a technician. The first personal computer 38 is located remotely from the first video display 34 and maintains communication therewith via a spread spectrum frequency hopping radio channel 1504 (or communications channel) or the like. One alternative to the spread spectrum frequency hopping radio channel is to use an optical channel such as an infrared bidirectional communications channel. Other examples of suitable communications channels employ other light frequencies, other radio frequencies or sound frequencies, either audible or, preferably, inaudible. Preferably, the communications channel 1504 consists primarily of air, but may include other electromagnetic, optical and/or sound conductors.

The spread spectrum frequency hopping radio channel 1504 preferably has an effective range of from between 500 and 1000 feet. As is known in the art "spread spectrum" is used to immunize a communications channel from interference or noise, while "frequency hopping" is used to make the communications channel 1504 secure. The metal cart 1502 provides several shelves 1506, 1508, 1510, and/or drawers (not shown), onto/into which the digital measuring instrument 16 (FIG. 1) can be put for storage along with other common shop tools. In addition, the shelves 1506, 1508, 1510 preferably contain all of the tools necessary to perform a specific inspection, e.g., a brake inspection, so that the metal cart 1502 is a self-contained inspection station—containing the first video display 34 along with the digital measuring instrument 16 and all of the other tools needed to perform the inspection.

The first video display 34 includes the touch screen interface, and is preferably a liquid-crystal-display-type video display. Alternatively, the first video display 34 may be a cathode-ray-tube-type video display, a light-emitting-diode-type display, or the like. As with the other technician terminal embodiments described above, the inspection program modifies the first personal computer 38 and is designed to accept all needed input through the touch screen interface on the first video display 34 via the spread spectrum frequency hopping radio channel 1504. The spread spectrum frequency hopping radio channel 1504 is interfaced through the first personal computer 38 through a suitable input/output port or ports 1512, which are preferably an interface adaptor or card, such as are readily available. The technician terminal may include interface cards, video displays, etc. available under, for example, the trade name CRUISELAN/ISA from ZENITH Data Systems Corporation of Buffalo Grove, Ill.; the trade name 1185DX from Telxon of Akron, Ohio; or any of a number of suitable and readily available computing devices operating under an operating system available under the trade name Windows CE from MICROSOFT Corporation of Redmond, Wash.; or other suitable wireless or wired terminal hardware. Alternatively, the input/output ports 1512 may be, e.g., a keyboard port and a video graphics array (VGA) port, such as is commonly known in the art. The input/output ports 1512 are coupled to a transceiver 1514, which is coupled to an antenna 1516. The transceiver 1514 is preferably a radio transceiver having an output power of about 100 mW, a data transfer rate of about 1.6 Mbps, and uses a 2.4 to 2.4835 GHz frequency band. Other suitable transceivers include, for example, optical transceivers, sound transceivers and the like. Integral with the housing 1518 that houses the first video display 34 is another antenna 1520 and another transceiver (internal), which couple the spread spectrum frequency hopping radio channel 1504 to the first video display 34. One example of a suitable first video display 34, including the housing 1518, the antenna 1520, and the transceiver is available under the trade name CRUISEPAD, also from ZENITH Data Systems Corporation.

Advantageously, the touch screen interface of the first video display 34 provides a mechanism whereby a technician can easily input information into the technician terminal 12 without the need for a keyboard. (Optionally, a keyboard coupled to the first video display 34 may be used instead of or in addition to the touch screen interface.) The touch screen interface of the above mentioned CRUISEPAD wireless remote interface can be actuated by either touching the surface of the first video display 34, or through the use of a stylus 1522 (or pen), as is known in the art.

Advantageously, through the use of the embodiment of FIG. 13, the first video display 34 may be located in a garage or shop area, while the first personal computer 38 is located is a cleaner, safer, more secure environment, such as a nearby office. In this way, the first personal computer 38 can be protected from elements such as brake dust, exhaust and other smoke particles, oil particles, tire dust and other contaminants present in the shop or garage area. Furthermore, the metal cart 1502 on which the first video display 34 is supported is relieved of the bulk of the first personal computer 38, making it lighter and/or providing more storage room for tools.

One additional feature of the embodiment of FIG. 13 is that the first video display 34 can be easily detached from its support 1500 on the metal cart 1502. Such detachment can be achieved, for example, through the use of hook-and-loop-type fasteners, or VELCRO fasteners, on the bottom surface of the housing 1518 of the first video display 34, and on the top surface of the support 1500 that holds the first video display 34 to the metal cart 1502. Advantageously, this detachability of the first video display 34 allows the technician to carry the first video display 34 in his/her hands as he/she performs an inspection. The first video display 34, housing 1518, antenna 1520, and transceiver, preferably weigh no more than four pounds and the housing 1218 preferably has exterior dimensions of about 10.6" W×9.8" D×1.0" H at its front edge sloping to 2.1" H at its back edge.

Also shown in FIG. 13 is a speaker 1524, through which audible output from the first personal computer 38 may be sounded. The speaker 1524 functions analogously to an internal speaker (not shown) within the first personal computer 38 (such as are well known in the art), but is located remotely from the first personal computer 38 and, like the first video display 34, is controlled by the first personal computer 38 via the spread spectrum frequency hopping radio interface.

Figure 14:
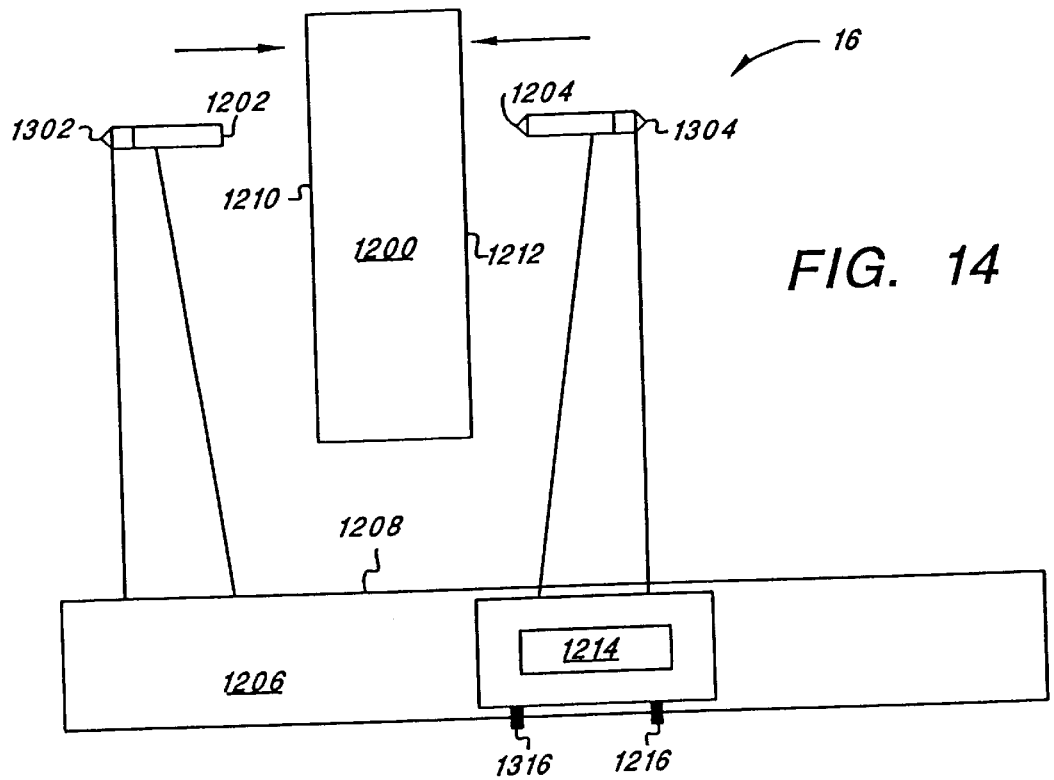
FIG. 14 is a schematic view of the dual-action digital calipers shown schematically in FIG. 1 as they are used to measure brake rotor thickness.

Referring next to FIG. 14, a schematic view is shown of the dual-action digital calipers as they are used to measure the thickness of a brake rotor 1200. The calipers have two sets of points 1202, 1204 that are positioned to measure outer surfaces. A first of the points 1202 is fixed relative to a rail 1206 that serves as the body of the calipers. A second of the points 1204 slides relative to the rail 1206 so as to assume various distances relative to the first of the points 1202. The first and second points 1202, 1204 inwardly point in opposite directions, i.e., toward each other, so that each of them can contact an opposing exterior surface of a structure, such as opposite sides 1210, 1212 of the brake rotor 1200.

As the second point 1204 slides along the rail 1206, a distance signal is generated by a linear encoder 1208 within the calipers. The distance signal is indicative of the distance between the first and second points 1202, 1204. The distance signal may be generated using capacitive electronics, such as in digital calipers marketed as "Brake Force" by Central Tools of Rhode Island. While the "Break Force" calipers measure only brake drum inner diameter, they can be modified in accordance with the present embodiment by adding the first and second points 1202, 1204 so as to measure thickness, as well as inner diameter. The distance signal is generated within the "Brake Force" calipers by electronics from Sylvac of Switzerland.

In order to take a measurement of a brake rotor 1200, the calipers are positioned so that the first point 1202 is adjacent to and against an interior side 1210 of the rotor 1200, and the second point 1204 is adjacent to an exterior side of the brake rotor 1200. The second point 1204 is then slid along and parallel to the rail 1206 toward the first point 1202 until both points 1202, 1204 are against their respective sides 1210, 1212 of the rotor 1200. As the second point 1204 is slidably moved, its relative distance from the first point 1202 is indicated by the distance signal, mentioned above, and this relative distance is displayed on a digital display 1214. When the first and second points 1202, 1204 are each against their respective opposing sides 1210, 1212 of the rotor 1200, the display 1214 indicates the exact thickness of the rotor (which is the exact distance between the points). The dual-action digital calipers are accurate to 0.001". The points 1202, 1204 are preferably positioned at the surfaces 1210, 1212 and the display 1214 is observed. The points 1202, 1204 are then moved radially across the surfaces 1210, 1212 in order to locate the thinnest area of the brake rotor 1200, as indicated on the display 1214. In this way, the technician assures that any "grooves" in the brake rotor 1200 are detected and used to measure the rotor's thickness. A transmit button 1216 is then depressed and the thickness of the rotor, which is displayed on the display 1214, is transmitted to the first personal computer 38. The first personal computer 38 automatically enters the measurement into the brake measurements inspection screen, described above, thereby eliminating the need for any manual entry of the measurement, and as a part of the generation of the inspection report compares the brake measurement with a specified brake measurement from the specifications/measurements database 26. In the event the brake measurement deviates from the specified brake measurement by more than a prescribed amount, the rotor is indicated on the inspection report as a required repair. Note that the brake rotor/drum measurements do not, in the present embodiment, result in "suggested" repairs, i.e., they are either okay or they are required repairs. This process is repeated for each rotor on the vehicle being inspected. In this way, precise measurements of rotor thickness are made, digitally transmitted to the technician terminal 12, automatically entered into an appropriate inspection screen and compared with specified brake measurements.

Figure 15:
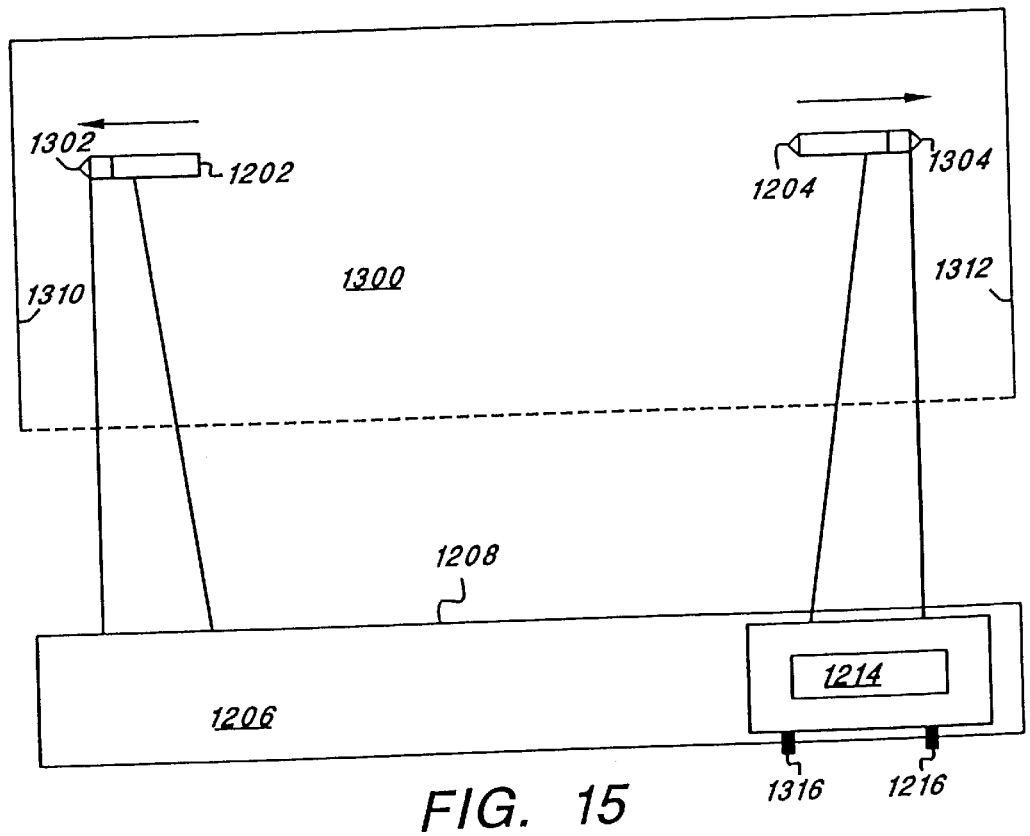
FIG. 15 is a schematic view of the dual-action digital calipers of FIG. 14 as they are used to measure the inner diameter of a brake drum.

Referring next to FIG. 15, a schematic view is shown of the dual-action digital calipers as they are used to measure the inner diameter of a brake drum. A switch 1316 is used to select the mode in which the dual action digital calipers operate, i.e., whether they measure thickness or inner diameter. The calipers have an additional set of points comprising a third point 1302 and a forth point 1304, which are positioned to measure inner surfaces, and inner diameter in particular. The third and forth points 1302, 1304 outwardly point in opposite directions, i.e., away from each other, so that each of them can contact an opposing interior surface of a structure, such as opposite sides 1310, 1312 of the interior annular surface of the brake drum 1300. The third point 1302 is oriented to point in a direction opposite from that of the first point 1202, and along with the first point 1202 is mounted to the rail upon a fixed caliper that fixes the position of the first and third points 1202, 1302 relative to the rail 1206. The forth point 1304 is oriented to point in a direction opposite from that of the second point 1204, and in the same direction as the first point 1202. The second and forth points 1204, 1304 are mounted to the rail upon a slidable caliper that allows them to slide, or move linearly, relative to the first and third points 1202, 1302. The third of the points 1302 is oriented oppositely from the first point 1202.

As mentioned above, the forth point 1304 slides along the rail 1206, in a manner similar to the second point 1204, so as to assume various distances relative to the third point 1302. As the forth point 1304 slides along the rail 1206, the distance signal is generated, as explained above. Because the distance signal is preferably indicative of the relative distance between the first and second points 1202, 1204, a correction factor, e.g., 2.4 inches, is, in practice, added to the distance indicated by the distance signal in order to determine the distance between the third and fourth points 1302, 1304. The correction factor can either be added by electronics within the calipers, when the switch 1316 is positioned to indicate that inner diameter is to be measured, or can be added by the first personal computer in response to the brake inspection module. The description below assumes that the correction factor is added by electronics within the calipers.

In order to take a measurement of a brake drum 1300, the calipers are positioned so that the third point 1302 is adjacent to and against a first side of the drum 1310, and the fourth point 1304 is adjacent to a second side of the brake drum 1312. The fourth point 1304 is then slid along the rail 1206 away from the fourth point 1302 until both points 1302, 1304 are against their respective opposite interior sides 1310, 1312 of the drum 1300. As the fourth point 1304 is slidably moved, its relative distance from the third point 1202 is determined (by adding the correction factor to the relative distance indicated by the distance signal) and is displayed on the digital display 1214. When the third and fourth points 1302, 1304 are each against their respective sides 1310, 1312 of the drum 1300, the display 1214 indicates the exact diameter of the drum (which is the exact distance between the points 1302, 1304). The transmit button 1216 is then depressed and the distance displayed on the display 1214 is transmitted to the first personal computer 38. The first personal computer 38 automatically enters the measurement into the brake measurements inspection screen, as described above, and as a part of the generation of the inspection report compares the brake measurement with a specified brake measurement from the specifications/measurements database 26. This process is repeated for each drum on the vehicle being inspected. In this way, precise measurements of drum diameter can be made, using the same tool as is used to make rotor thickness measurements. The drum diameter is digitally transmitted to the technician terminal 12 and is automatically entered into an appropriate inspection screen.

While the invention herein disclosed has been described by means of specific embodiments and applications thereof, numerous modifications and variations could be made thereto by those skilled in the art without departing from the scope of the invention set forth in the claims.

For example, as will be appreciated by the skilled artisan, the teachings herein can be applied to many fields of technology and diagnosis in repair situations. Specifically, for example, the teachings herein can be used in computer network diagnosis and repair applications where network test equipment can be used to input measurements. These measurements can be compared to specifications and repair instructions retrieved from a database in response to this comparison in order to instruct a technician as to how to effect computer network repair. Another example of an application to which the teachings herein can be applied is in air conditioning diagnosis and repair, and other examples, truck and tractor diagnosis and repair, home appliance diagnosis and repair, home electronics diagnosis and repair, assembly lines for diagnosing and repairing products as they are constructed, for boat repair, recreational vehicle repair and in the rental car industry to guide a technician through the testing and servicing of vehicles periodically and especially between rentals. Based on the examples given herein and the descriptions above, numerous other applications will be apparent to the skilled artisan to which the present teachings can be applied, and, accordingly, the claims below should be read in this vein and not limited to the specific embodiment described herein.

What is claimed is:

1. An integrated diagnosis, repair and invoicing system comprising:

a technician terminal including means for displaying a plurality of inspection screens, means for inputting inspection results, and means for generating an inspection report;

a point-of-sale terminal coupled to the technician terminal, the point-of-sale terminal including means for generating a cost estimate report in response to the generation of the inspection report;

a printer coupled to the point-of-sale terminal for printing the cost estimate report; and a database system coupled to the technician terminal and to the point-of-sale terminal, the data base system comprising:

a specifications database comprising specifications;

the technician terminal including means for comparing the specifications with the inspection results, and means for generating the inspection report in response to the means for comparing.

2. The integrated diagnosis, repair and invoicing system of claim 1 further comprising:

a measuring device coupled to the technician terminal, the measuring device including means for taking measurements from a system being inspected and means for communicating the measurements to the technician terminal.

3. The integrated diagnosis, repair and invoicing system of claim 2 wherein said means for communicating includes an electrical conductor coupled between said technician terminal and said measuring device.

4. The integrated diagnosis, repair and invoicing system of claim 1 wherein the point of sale terminal further comprises means for generating an invoice report.

5. The integrated diagnosis, repair and invoicing system of claim 4 wherein said point-of-sale terminal comprises:

a second video display, and a second computer coupled to the second video display, the second computer being modified with a point-of-sale program comprising means for generating said invoice report.

6. The integrated diagnosis, repair and invoicing system of claim 1 wherein said database system further comprises:

a customer/inspection database, the technician terminal including means for storing an inspection record into the customer/inspection database in response to the generating of the inspection report.

7. The integrated diagnosis, repair and invoicing system of claim 6 wherein said database system further comprises:

a parts catalog database comprising part costs, the means for generating the cost estimate report generating the cost estimate report in response to the part costs.

8. The integrated diagnosis, repair and invoicing system of claim 6 wherein said data base system further comprises:

an inspection guidelines database comprising inspection guidelines, said technician terminal including means for selectively displaying the inspection guidelines.

9. The integrated diagnosis, repair and invoicing system of claim 1 wherein said technician terminal comprises:

a first video display; and a first computer coupled to the first video display, the first computer being modified with an inspection program.

10. The integrated diagnosis, repair and invoicing system of claim 9 wherein said technician terminal further comprises:

a housing enclosing said first computer; and a plurality of wheels mounted to said housing.

11. The integrated diagnosis, repair and invoicing system of claim 9 wherein said technician terminal further comprises:

a touch screen interface coupled to said first video display, said touch screen interface including means for detecting an approximate location on the first video display at which touching of the first video display occurs.

12. The integrated diagnosis, repair and invoicing system of claim 9 wherein said technician terminal further comprises:

a first transceiver coupled to the first computer;

a second transceiver coupled to the first video display; and a communications channel coupled between the first and second transceivers, wherein the first video display is coupled to the first computer through the communications channel.

13. The integrated diagnosis, repair and invoicing system of claim 12 wherein said communications channel includes air.

14. The integrated diagnosis, repair and invoicing system of claim 13 wherein said first and second transceivers are radio frequency transceivers and wherein said communications channel is a radio frequency communications channel.

15. In an integrated diagnosis, repair and invoicing system, a method including:

selecting a make and model of a system being inspected using a first computer system;

retrieving a measurement/specification for the system being inspected, having been selected, from a measurements/specifications database;

prompting a user of the first computer system to conduct an inspection of the system being inspected and to enter an inspection result into the first computer system;

comparing the inspection result with the measurement/specification, having been retrieved, so as to determine whether the inspection result is outside a first prescribed tolerance of the measurement/specification, having been retrieved;

generating an inspection report that indicates whether the inspection result is outside the first prescribed tolerance of the measurement/specification;

communicating the inspection report to a second computer system; and generating, within the second computer system, a cost estimate report in the event the inspection result is outside the first prescribed tolerance of the measurement/specification, the cost estimate report indicating an expected cost of repair.

16. The method of claim 15 wherein said selecting of said make and model includes touching a first video display having a touch screen interface.

17. The method of claim 15 including:

entering said inspection result using a digital measuring instrument.

18. The method of claim 15 wherein said comparing of said inspection result with said measurement/specification having been retrieved includes comparing said inspection result with said measurement/specification having been retrieved so as to determine whether the inspection result is outside a second prescribed tolerance of the measurement/specification having been retrieved, the second prescribed tolerance being indicative of a repair that is required, and said first prescribed tolerance being indicative of a repair that is suggested.

19. The method of claim 18 wherein said generating of said inspection report includes generating said inspection report having an indication of whether a repair is required or suggested.

* * * * *